US010672561B2

(12) United States Patent
Robinson et al.

(10) Patent No.: US 10,672,561 B2
(45) Date of Patent: Jun. 2, 2020

(54) COILED CAPACITOR

(71) Applicant: Capacitor Sciences Incorporated, Menlo Park, CA (US)

(72) Inventors: Matthew R. Robinson, San Francisco, CA (US); Paul Furuta, Sunnyvale, CA (US); Pavel Ivan Lazarev, Palo Alto, CA (US)

(73) Assignee: CAPACITOR SCIENCES INCORPORATED, Menlo Park, CA (US)

( * ) Notice: Subject to any disclaimer, the term of this patent is extended or adjusted under 35 U.S.C. 154(b) by 38 days.

(21) Appl. No.: 15/943,342

(22) Filed: Apr. 2, 2018

(65) Prior Publication Data

US 2018/0226193 A1    Aug. 9, 2018

Related U.S. Application Data

(63) Continuation of application No. 14/752,600, filed on Jun. 26, 2015, now Pat. No. 9,941,051.

(51) Int. Cl.
*H01G 4/18* (2006.01)
*H01G 4/012* (2006.01)
(Continued)

(52) U.S. Cl.
CPC ............ *H01G 4/18* (2013.01); *H01G 4/012* (2013.01); *H01G 4/015* (2013.01); *H01G 4/232* (2013.01); *H01G 4/32* (2013.01); *Y02T 10/7022* (2013.01)

(58) Field of Classification Search
None
See application file for complete search history.

(56) References Cited

U.S. PATENT DOCUMENTS 3,407,394 A   10/1968  Hartke
4,694,377 A    9/1987  MacDougall et al.
(Continued)

FOREIGN PATENT DOCUMENTS

CA    2074848 A1    2/1998
CN    100449661     1/2009
(Continued)

OTHER PUBLICATIONS

Center for Dielectric Studies, Janosik, et al., "Ultra-High Energy Density Capacitors Through Improved Glass Technology", pp. 1-5 Center for Dielectric Studies Penn State University, dated 2004.
(Continued)

*Primary Examiner* — Eric W Thomas
(74) *Attorney, Agent, or Firm* — BCF LLP

(57) ABSTRACT

The present disclosure provides a coiled capacitor comprising a coil formed by a flexible multilayered tape, and a first terminating electrode and a second terminating electrode which are located on butts of the coil. The flexible multilayered tape contains the following sequence of layers: first metal layer, a layer of a plastic, second metal layer, a layer of energy storage material. The first metal layer forms ohmic contact with the first terminating electrode and the second metal layer forms ohmic contact with the second terminating electrode. The energy storage material comprises material selected from the list comprising rylene fragments, doped oligoaniline and p-oligo-phenylene, supramolecular structures, colloidal composite with dispersion (suspension) of electro-conductive anisometric particles in an insulator matrix, material comprises a surfactant.

1 Claim, 6 Drawing Sheets

(51) Int. Cl.
*H01G 4/015* (2006.01)
*H01G 4/32* (2006.01)
*H01G 4/232* (2006.01)

(56) References Cited

U.S. PATENT DOCUMENTS

| | | | |
|---|---|---|---|
| 4,702,562 A | 10/1987 | Scheuble et al. |
| 4,894,186 A | 1/1990 | Gordon et al. |
| 5,141,837 A | 8/1992 | Nguyen et al. |
| 5,187,639 A | 2/1993 | Ogawa et al. |
| 5,248,774 A | 9/1993 | Dietz et al. |
| 5,312,896 A | 5/1994 | Bhardwaj et al. |
| 5,384,521 A | 1/1995 | Coe |
| 5,395,556 A | 3/1995 | Drost et al. |
| 5,466,807 A | 11/1995 | Dietz et al. |
| 5,514,799 A | 5/1996 | Varanasi et al. |
| 5,581,437 A | 12/1996 | Sebillotte et al. |
| 5,583,359 A | 12/1996 | Ng et al. |
| 5,679,763 A | 10/1997 | Jen et al. |
| 5,739,296 A | 4/1998 | Gvon et al. |
| 5,742,471 A | 4/1998 | Barbee et al. |
| 5,840,906 A | 11/1998 | Zoltewicz et al. |
| 5,880,951 A | 3/1999 | Inaba |
| 6,025,094 A | 2/2000 | Visco et al. |
| 6,049,428 A | 4/2000 | Khan et al. |
| 6,174,394 B1 | 1/2001 | Gvon et al. |
| 6,282,081 B1 | 8/2001 | Takabayashi et al. |
| 6,294,593 B1 | 9/2001 | Jeng et al. |
| 6,341,056 B1 | 1/2002 | Allman et al. |
| 6,391,104 B1 | 5/2002 | Schulz |
| 6,426,861 B1 | 7/2002 | Munshi |
| 6,501,093 B1 | 12/2002 | Marks |
| 6,583,284 B1 | 6/2003 | Sidorenko et al. |
| 6,617,830 B2 | 9/2003 | Nozu et al. |
| 6,798,642 B2 | 9/2004 | Decker et al. |
| 7,025,900 B2 | 4/2006 | Sidorenko et al. |
| 7,026,019 B2 | 4/2006 | Dutova et al. |
| 7,033,406 B2 | 4/2006 | Weir et al. |
| 7,045,177 B2 | 5/2006 | Dutova et al. |
| 7,160,485 B2 | 1/2007 | Nazarov et al. |
| 7,211,824 B2 | 5/2007 | Lazarev |
| 7,460,352 B2 | 12/2008 | Jamison et al. |
| 7,466,536 B1 | 12/2008 | Weir et al. |
| 7,498,689 B2 | 3/2009 | Mitani et al. |
| 7,579,709 B2 | 8/2009 | Goetz et al. |
| 7,625,497 B2 | 12/2009 | Iverson et al. |
| 7,750,505 B2 | 7/2010 | Ichikawa |
| 7,795,431 B2 | 9/2010 | Pschirer et al. |
| 7,808,771 B2 | 10/2010 | Nguyen et al. |
| 7,837,902 B2 | 11/2010 | Hsu et al. |
| 7,888,505 B2 | 2/2011 | Doutova et al. |
| 7,893,265 B2 | 2/2011 | Facchetti et al. |
| 7,910,736 B2 | 3/2011 | Koenemann et al. |
| 7,947,199 B2 | 5/2011 | Wessling |
| 8,143,853 B2 | 3/2012 | Jestin et al. |
| 8,222,074 B2 | 7/2012 | Lazarev |
| 8,231,809 B2 | 7/2012 | Pschirer et al. |
| 8,236,998 B2 | 8/2012 | Nagata et al. |
| 8,344,142 B2 | 1/2013 | Marder et al. |
| 8,372,527 B2 | 2/2013 | Morishita et al. |
| 8,404,844 B2 | 3/2013 | Kastler et al. |
| 8,527,126 B2 | 9/2013 | Yamamoto et al. |
| 8,552,179 B2 | 10/2013 | Lazarev |
| 8,818,601 B1 | 8/2014 | V et al. |
| 8,895,118 B2 | 11/2014 | Geivandov et al. |
| 8,929,054 B2 | 1/2015 | Felten et al. |
| 8,938,160 B2 | 1/2015 | Wang |
| 9,056,676 B1 | 6/2015 | Wang |
| 9,293,260 B2 | 3/2016 | Schmid et al. |
| 9,589,727 B2 | 3/2017 | Lazarev |
| 9,733,406 B2 | 8/2017 | Doutova et al. |
| 9,941,051 B2 * | 4/2018 | Robinson .............. H01G 4/18 |
| 2002/0027220 A1 | 3/2002 | Wang et al. |
| 2002/0048140 A1 | 4/2002 | Gallay et al. |
| 2003/0026063 A1 | 2/2003 | Munshi |
| 2003/0102502 A1 | 6/2003 | Togashi |
| 2003/0103319 A1 | 6/2003 | Kumar et al. |
| 2003/0142461 A1 | 7/2003 | Decker et al. |
| 2003/0219647 A1 | 11/2003 | Wariishi |
| 2003/0232153 A1 | 12/2003 | Nazarov et al. |
| 2004/0173873 A1 | 9/2004 | Kumar et al. |
| 2004/0222413 A1 | 11/2004 | Hsu et al. |
| 2005/0118083 A1 | 6/2005 | Tabuchi |
| 2005/0146671 A1 | 7/2005 | Khavrounyak et al. |
| 2006/0120014 A1 | 6/2006 | Nakamura et al. |
| 2006/0120020 A1 | 6/2006 | Dowgiallo |
| 2007/0001258 A1 | 1/2007 | Aihara |
| 2007/0108940 A1 | 5/2007 | Sainomoto et al. |
| 2007/0159767 A1 | 7/2007 | Jamison et al. |
| 2008/0002329 A1 | 1/2008 | Pohm et al. |
| 2008/0150484 A1 | 6/2008 | Kimball et al. |
| 2008/0266750 A1 | 10/2008 | Wu et al. |
| 2008/0283283 A1 | 11/2008 | Abe et al. |
| 2009/0034073 A1 | 2/2009 | Lazarev |
| 2009/0040685 A1 | 2/2009 | Hiemer et al. |
| 2009/0184355 A1 | 7/2009 | Brederlow et al. |
| 2009/0191394 A1 | 7/2009 | Lazarev et al. |
| 2010/0038629 A1 | 2/2010 | Lazarev |
| 2010/0085521 A1 | 4/2010 | Kasianova et al. |
| 2010/0178728 A1 | 7/2010 | Zheng et al. |
| 2010/0183919 A1 | 7/2010 | Holme et al. |
| 2010/0190015 A1 | 7/2010 | Kasianova |
| 2010/0193777 A1 | 8/2010 | Takahashi et al. |
| 2010/0214719 A1 | 8/2010 | Kim et al. |
| 2010/0233491 A1 | 9/2010 | Nokel et al. |
| 2010/0255381 A1 | 10/2010 | Holme et al. |
| 2010/0269731 A1 | 10/2010 | Jespersen et al. |
| 2010/0279122 A1 | 11/2010 | Nokel et al. |
| 2010/0309606 A1 | 12/2010 | Allers et al. |
| 2010/0309696 A1 | 12/2010 | Guillot et al. |
| 2010/0315043 A1 | 12/2010 | Chau |
| 2011/0006393 A1 | 1/2011 | Cui |
| 2011/0042649 A1 | 2/2011 | Duvall et al. |
| 2011/0064892 A1 | 3/2011 | Nokel et al. |
| 2011/0079733 A1 | 4/2011 | Langhals et al. |
| 2011/0079773 A1 | 4/2011 | Wasielewski et al. |
| 2011/0110015 A1 | 5/2011 | Zhang et al. |
| 2011/0228442 A1 | 9/2011 | Zhang et al. |
| 2012/0008251 A1 | 1/2012 | Yu et al. |
| 2012/0033342 A1 | 2/2012 | Ito et al. |
| 2012/0053288 A1 | 3/2012 | Morishita et al. |
| 2012/0056600 A1 | 3/2012 | Nevin |
| 2012/0113380 A1 | 5/2012 | Geivandov et al. |
| 2012/0122274 A1 | 5/2012 | Lazarev |
| 2012/0244330 A1 | 9/2012 | Sun et al. |
| 2012/0268862 A1 | 10/2012 | Song et al. |
| 2012/0274145 A1 | 11/2012 | Taddeo |
| 2012/0302489 A1 | 11/2012 | Rodrigues et al. |
| 2013/0056720 A1 | 3/2013 | Kim et al. |
| 2013/0187475 A1 | 7/2013 | Vendik et al. |
| 2013/0194716 A1 | 8/2013 | Holme et al. |
| 2013/0215535 A1 | 8/2013 | Bellomo |
| 2013/0314839 A1 | 11/2013 | Terashima et al. |
| 2013/0342967 A1 | 12/2013 | Lai et al. |
| 2014/0035100 A1 | 2/2014 | Cho |
| 2014/0036410 A1 | 2/2014 | Okamatsu et al. |
| 2014/0098458 A1 | 4/2014 | Almadhoun et al. |
| 2014/0158340 A1 | 6/2014 | Dixler et al. |
| 2014/0169104 A1 | 6/2014 | Kan et al. |
| 2014/0185260 A1 | 7/2014 | Chen et al. |
| 2014/0268490 A1 | 9/2014 | Tsai et al. |
| 2014/0347787 A1 | 11/2014 | Fathi et al. |
| 2015/0008735 A1 | 1/2015 | Mizoguchi |
| 2015/0158392 A1 | 6/2015 | Zhao |
| 2015/0162131 A1 | 6/2015 | Felten et al. |
| 2015/0249401 A1 | 9/2015 | Eriksen et al. |
| 2015/0302990 A1 | 10/2015 | Ghosh et al. |
| 2016/0020026 A1 | 1/2016 | Lazarev |
| 2016/0020027 A1 | 1/2016 | Lazarev |
| 2016/0254092 A1 | 9/2016 | Lazarev et al. |
| 2016/0314901 A1 | 10/2016 | Lazarev |
| 2016/0340368 A1 | 11/2016 | Lazarev |
| 2016/0379757 A1 | 12/2016 | Robinson et al. |
| 2017/0117097 A1 | 4/2017 | Furuta et al. |

(56) References Cited

U.S. PATENT DOCUMENTS

| | | |
|---|---|---|
| 2017/0233528 A1 | 8/2017 | Sharp et al. |
| 2017/0236648 A1 | 8/2017 | Lazarev et al. |
| 2017/0237271 A1 | 8/2017 | Kelly-Morgan et al. |
| 2017/0237274 A1 | 8/2017 | Lazarev et al. |
| 2017/0287637 A1 | 10/2017 | Lazarev et al. |
| 2017/0287638 A1 | 10/2017 | Lazarev et al. |

FOREIGN PATENT DOCUMENTS

| | | |
|---|---|---|
| CN | 102426918 A | 4/2012 |
| CN | 103261370 A | 8/2013 |
| CN | 203118781 U | 8/2013 |
| CN | 203377785 U | 1/2014 |
| CN | 103755703 A | 4/2014 |
| CN | 103986224 A | 8/2014 |
| DE | 10203918 A1 | 8/2003 |
| DE | 102010012949 A1 | 9/2011 |
| DE | 102011101304 A1 | 11/2012 |
| DE | 102012016438 A1 | 2/2014 |
| EP | 0493716 A1 | 7/1992 |
| EP | 0585999 A1 | 3/1994 |
| EP | 0602654 A1 | 6/1994 |
| EP | 0729056 A1 | 8/1996 |
| EP | 0791849 A1 | 8/1997 |
| EP | 1158320 A2 | 11/2001 |
| EP | 0986080 A3 | 1/2004 |
| EP | 0865142 B1 | 5/2008 |
| EP | 2062944 A1 | 5/2009 |
| EP | 2260035 A2 | 12/2010 |
| EP | 2415543 A1 | 2/2012 |
| EP | 2667392 A1 | 11/2013 |
| EP | 1486590 B1 | 12/2013 |
| EP | 2759480 A1 | 7/2014 |
| GB | 547853 A | 9/1942 |
| GB | 923148 A | 4/1963 |
| GB | 2084585 B | 11/1983 |
| JP | S6386731 A | 4/1988 |
| JP | H03253014 A | 11/1991 |
| JP | 2786298 B2 | 8/1998 |
| JP | 2000100484 A | 4/2000 |
| JP | 2007287829 A | 11/2007 |
| JP | 2010106225 A | 5/2010 |
| JP | 2010160989 A | 7/2010 |
| JP | 2011029442 A | 2/2011 |
| JP | 2014139296 A | 7/2014 |
| RU | 2199450 C1 | 2/2003 |
| RU | 2512880 C2 | 4/2014 |
| WO | 1990009616 A1 | 8/1990 |
| WO | 0139305 A1 | 5/2001 |
| WO | 2002026774 A2 | 4/2002 |
| WO | 2002094942 A9 | 4/2003 |
| WO | 2007078916 A2 | 7/2007 |
| WO | 2008038047 A2 | 4/2008 |
| WO | 2009158553 A2 | 12/2009 |
| WO | 2011056903 A1 | 5/2011 |
| WO | 2012012672 A2 | 1/2012 |
| WO | 2012084536 A1 | 6/2012 |
| WO | 2012122312 A1 | 9/2012 |
| WO | 2012162500 A2 | 11/2012 |
| WO | 2013009772 A1 | 1/2013 |
| WO | 2013085467 A1 | 6/2013 |
| WO | 2014009686 A1 | 1/2014 |
| WO | 2015003725 A1 | 1/2015 |
| WO | 2015175522 A1 | 11/2015 |
| WO | 2015175558 A2 | 11/2015 |

OTHER PUBLICATIONS

Chao-Hsien Ho et al., "High dielectric constant polyaniline/poly(acrylic acid) composites prepared by in situ polymerization", Synthetic Metals, vol. 158, pp. 630-637 (2008).

Congressional Research Service, Paul W. Parfomak, "Energy Storage for Power Grids and Electric Transportation: A Technology Assessment", pp. 87-94; Members and Committees of Congress; Mar. 27, 2012.

Co-Pending U.S. Appl. No. 15/194,224, to Lazarev et al., filed Jun. 27, 2016.

Co-Pending U.S. Appl. No. 15/368,171, to Lazarev et al., filed Dec. 2, 2016.

Co-Pending U.S. Appl. No. 15/430,307, to Lazarev et al, filed Feb. 10, 2017.

Co-Pending U.S. Appl. No. 15/449,587, to Lazarev et al., filed Mar. 3, 2017.

Co-Pending U.S. Appl. No. 15/675,614, to Kelly-Morgan, filed Aug. 11, 2017.

Co-Pending U.S. Appl. No. 15/710,587, to Li et al, filed Sep. 20, 2017.

Co-Pending U.S. Appl. No. 15/469,126, to Lazarev et al, filed Mar. 24, 2017.

D C Tiwari, et al: "Temperature dependent studies of electric and dielectric properties of polythiophene based nano composite", Indian Journal of Pure & Applied Physicsvol. 50, Jan. 2012. pp. 49-56.

Deily, Dielectric and Optical Characterization of Polar Polymeric Materials: Chromophore Entrained PMMA Thin Films, Thesis, 2008.

Department of Chemistry and Biochemistry, Hardy, et al. "Converting an Electrical Insulator into a Dielectric Capacitor: End-Capping Polystyrene with Oligoaniline"; pp. 799-807, Rensselaer Polytechnic Institute, Troy, New York 12180; Feb. 17, 2013.

Department of Chemistry, Ho et al., "High dielectric constant polyanilinelpoly(acrylic acid) composites prepared by in situ polymerization", pp. 630-637; National Taiwan University, Taipei, Taiwan, ROC, Apr. 15, 2008.

Deruiter, J. Resonance and Induction Tutorial. Auburn University-Principles of Drug Action 1 Course Material. Spring 2005, 19 pages.

Extended European Search Report . 15792494.5, dated Dec. 11, 2017.

Extended European Search Report for Application No. 15792405.1, dated Nov. 10, 2017.

Final Office Action dated Feb. 14, 2018 for U.S. Appl. No. 15/043,186.

Final Office Action dated May 2, 2017.

Final Office Action for U.S. Appl. No. 15/043,247, dated Oct. 4, 2017.

Final Office Action for U.S. Appl. No. 15/043,249, dated Feb. 6, 2018.

Final Office Action for U.S. Appl. No. 15/194,224, dated Jan. 30, 2018.

Final Office Action for U.S. Appl. No. 14/919,337, dated May 1, 2017.

Handy, Scott T. "Ionic Liquids-Classes and Properties" Published Sep. 2011, Accessed Aug. 28, 2017, InTechweb.org.

Henna Ruuska et al., "A Density Functional Study on Dielectric Properties of Acrylic Acid Crafted Polypropylene", The Journal of Chemical Physics, vol. 134, p. 134904 (2011).

Hindawi Publishing Corporation, Chávez-Castillo et al, "Third-Order Nonlinear Optical Behavior of Novel Polythiophene Derivatives Functionalized with Disperse Red 19 Chromophore", pp. 1-11, International Journal of Polymer Science vol. 2015, Article ID 219361, Mar. 12, 2015.

Hindawi Publishing Corporation, González-Espasandin et al., "Fuel Cells: A Real Option for Unmanned Aerial Vehicles Propulsion", pp. 1-13, Torrej'on de Ardoz, 28850 Madrid, Spain Jan. 30, 2014.

Hindawi Publishing Corporation, Khalil Ahmed et al., "High dielectric constant polyaniline/poly(acrylic acid) composites prepared by in situ polymerization", pp. 630-637, University of the Punjab, New Campus, Lahore 54590, Oct. 17, 2015.

Hsing-Yang Tsai et al, "1,6- and 1,7-Regioisomers of Asymmetric and Symmetric Perylene Bisimides: Synthesis, Characterization and Optical Properties" Molecules, 2014, vol. 19, pp. 327-341.

Hsing-Yang Tsai et al, "Synthesis and optical properties of novel asymmetric perylene bisimides", Journal of Luminescence, Vole 149, pp. 103-111 (2014).

Institute of Transportation Studies, Burke, et al. "Review of the Present and Future Applications of Supercapacitors in Electric and Hybrid Vehicles", pp. 2-23 UC Davis ITS; Dec. 2014.

(56) References Cited

OTHER PUBLICATIONS

International Search Report and Written Opinion dated Jul. 31, 2017 for International Patent Application PCT/US2017/024589.
International Search Report and Written Opinion for International Application No. PCT/US2015/030356, dated Jul. 28, 2015.
International Search Report and Written Opinion for International Application No. PCT/US2015/030415, dated Nov. 4, 2015.
International Search Report and Written Opinion for International Application No. PCT/US2015/058890, dated Feb. 25, 2016.
International Search Report and Written Opinion for International Application No. PCT/US2016/019641, dated Jul. 12, 2016.
International Search Report and Written Opinion for International Application No. PCT/US2016/033628, dated Sep. 1, 2016.
International Search Report and Written Opinion for International Application No. PCT/US2016/039395, dated Jul. 1, 2016.
International Search Report and Written Opinion for International Application No. PCT/US2016/039395, dated Oct. 20, 2016.
International Search Report and Written Opinion for International Application No. PCT/US2016/57765, dated Jan. 5, 2017.
International Search Report and Written Opinion for International Application No. PCT/US2017/016862, dated Aug. 14, 2017.
International Search Report and Written Opinion for International Application No. PCT/US2017/017146, dated May 11, 2017.
International Search Report and Written Opinion for International Application No. PCT/US2017/017150, dated May 18, 2017.
International Search Report and Written Opinion for International Application No. PCT/US2017/24150, dated Jun. 21, 2017.
International Search Report and Written Opinion for International Application No. PCT/US2017/24371, dated Aug. 2, 2017.
International Search Report and Written Opinion for International Application No. PCT/US2017/24600, dated Aug. 14, 2017.
International Search Report and Written Opinion dated Feb. 23, 2018 for International Patent Application No. PCT/US17/64252.
International Search Report and Written Opinion dated Feb. 25, 2016 for International Application No. PCT/US15/58890, to Pavel Ivan Lazarev, filed Nov. 3, 2015.
International Search Report and Written Opinion dated Jul. 12, 2016 for International Application No. PCT/US2016/019641, to Pavel Ivan Lazarev, filed Feb. 25, 2016.
Supplementary European Search Report issued in corresponding European patent application 16815439.1 dated Feb. 4, 2019.
International Search Report and Written Opinion dated Jun. 7, 2017 for International Application No. PCT/US2017/24589, to Pavel Ivan Lazarev, filed Jun. 7, 2017.
International Search Report and Written Opinion dated Oct. 20, 2016 International Application No. PCT/US2016/039395, to Matthew R. Robinson, et al., filed Jun. 24, 2016.
International Search Report and Written Opinion dated Sep. 1, 2016 for International Application No. PCT/US2016/033628, to Pavel Ivan Lazarev, filed Sep. 1, 2016.
International Union of Pure and Applied Chemistry Polymer Divison Stejskal et al., "Polyaniline: Thin Films and Colloidal Dispersions (IUPAC Technical Report)", vol. 77, No. 5, pp. 815-826, Russian Academy of Sciences, St. Petersburg 199004, Russia; 2005.
Isoda, Kyosuke et al. "Truxene-Based Columnar Liquid Crystals: Self-Assembled Structures and Electro-Active Properties." Chemistry— An Asian Journal (2009), vol. 4, No. 10, pp. 1619-1625.
JACS Articles, Kang et. al., "Ultralarge Hyperpolarizability Twisted π-Electron System Electra-Optic Chromophores: Synthesis, Solid-State and Solution-Phase Structural Characteristics, Electronic Structures, Linear and Nonlinear Optical Properties, and Computational Studies", pp. 3267-3286; Perugia, Italy Feb. 20, 2007.
Jaroslav Stejskal and Irina Sapurina, "Polyaniline: Thin Films and Colloidal Dispersions (IUPAC Technical Report)", Pure and Applied Chemistry, vol. 77, No. 5, pp. 815-826 (2005).
Johnson, Kieth E. "What's an Ionic Liquid?" The Electrochemical Society Interface, Published Spring 2007, pp. 38-41, Accessed Aug. 28, 2017.

Kontrakt Technology Limited, Alla Sakharova, PhD., "Cryscade Solar Limited: Intellectual Property Portfolio summary", pp. 1-3, Cryscade Solar Limited; Apr. 9, 2015.
Li, Li-Li et al. "Synthesis and Mesomorphism of Ether-ester Mixed Tail C3-symmetrical Truxene discotic liquid crystals." Liquid Crystals(2010), vol. 37, No. 5, pp. 499-506.
Liang, Mao et al. "Synthesis and Photovoltaic Performance of Two Triarylamine Organic Dyes Based on Truxene." Yinyong Huaxue (2011) vol. 28 No. 12, pp. 1387-1392.
Lu, Meng et al. "Organic Dyes Incorporating Bis-hexapropyltruxeneamino Moiety for efficient Dye-sensitized Solar Cells." Journal of Physical Chemistry C (2011) vol. 115, No. 1, pp. 274-281.
Maddalena, Francesco "Why are Ionic Liquids, Liquids?" http://www.quora.com/why-are-ionic-liquids-liquids?, Published Jan. 26, 2017, Accessed Aug. 28, 2017.
Manukian, BK. 216. IR.-spektroskopische Untersuchungen in der Imidazol-Reihe. Helvetica Chimica Acta. 1965, vol. 48, page.
Manukian, BK. 216. IR.-spektroskopische Untersuchungen in der Imidazol-Reihe. Helvetica Chimica Acta. 1965, vol. 48, p. 2001.
Microelectronics Research and Communications Institute, Founders et al., "High-Voltage Switching Circuit for Nanometer Scale CMOS Technologies", pp. 1-4, University of Idaho, Moscow, ID 83843 USA, Apr. 30, 2007.
Molecular Diversity Preservation International, Barber, et al. "Polymer Composite and Nanocomposite Dielectric Materials for Pulse Power Energy Storage" pp. 1-32; 29 University of South Carolina, Columbia, SC 29208 Oct. 2009.
Nagabrahmandachari et al. "Synthesis and Spectral Analysis of Tin Tetracarboxylates and Phosphinates" Indian Journal of Chemistry— Section A, 1995, vol. 34A, pp. 658-660.
Ni, Hai-Lang et al. "Truxene Discotic Liquid Crystals with Two Different Ring Substituents: Synthesis, Metamorphosis and High Charged Carrier Mobility ." Liquid Crystals, vol. 40, No. 3, pp. 411-420.
Non-Final Action for U.S. Appl. No. 15/043,186, dated Feb. 14, 2018.
Non-Final Office Action dated Jun. 13, 2017 for U.S. Appl. No. 15/163,595.
Non-Final Office Action for U.S. Appl. No. 14/719,072, dated Aug. 2, 2017.
Non-Final Office Action for U.S. Appl. No. 15/043,247, dated Jun. 22, 2017.
Non-Final Office Action for U.S. Appl. No. 15/043,315, dated Dec. 26, 2017.
Non-Final Office Action for U.S. Appl. No. 15/053,943, dated Apr. 19, 2017.
Non-Final Office Action for U.S. Appl. No. 15/090,509, dated Jun. 22, 2017.
Non-Final Office Action for U.S. Appl. No. 15/163,595, dated Jan. 17, 2018.
Non-Final Office Action for U.S. Appl. No. 15/194,224, dated Sep. 27, 2017.
Non-Final Office Action for U.S. Appl. No. 14/710,480, dated May 8, 2017.
Non-Final Office Action for U.S. Appl. No. 14/752,600, dated Jan. 23, 2017.
Non-Final Office Action for U.S. Appl. No. 14/919,337, dated Jan. 4, 2017.
Non-Final Office Action for U.S. Appl. No. 15/043,186, dated Jun. 2, 2017.
Non-Final/Final Office Action for U.S. Appl. No. 15/043,247, dated Feb. 20, 2018.
Notice of Allowance for U.S. Appl. No. 14/710,480, dated Nov. 24, 2017.
Notice of Allowance for U.S. Appl. No. 14/710,480, dated Jan. 11, 2018.
Notice of Allowance for U.S. Appl. No. 14/710,840, dated Oct. 6, 2017.
Notice of Allowance for U.S. Appl. No. 14/719,072, dated Nov. 16, 2017.
Notice of Allowance for U.S. Appl. No. 14/752,600, dated Jul. 27, 2017.

(56) References Cited

OTHER PUBLICATIONS

Notice of Allowance for U.S. Appl. No. 14/919,337, dated Jul. 19, 2017.
Notice of Allowance for U.S. Appl. No. 14/919,337, dated Mar. 5, 2018.
Notice of Allowance for U.S. Appl. No. 14/919,337, dated Nov. 8, 2017.
Notice of Allowance for U.S. Appl. No. 14/931,757, dated Dec. 29, 2017.
Notice of Allowance for U.S. Appl. No. 14/931,757, dated Feb. 8, 2018.
Notice of Allowance for U.S. Appl. No. 14/931,757, dated Jul. 17, 2017.
Notice of Allowance for U.S. Appl. No. 14/931,757, dated Oct. 31, 2017.
Notice of Allowance for U.S. Appl. No. 15/053,943, dated Aug. 14, 2017.
Notice of Allowance for U.S. Appl. No. 15/090,509, dated Jan. 24, 2018.
Notice of Allowance for U.S. Appl. No. 14/710,491, dated Oct. 24, 2016.
Office Action dated Dec. 13, 2017 for Taiwan Patent Application No. 106104499.
Office Action dated Dec. 13, 2017 for Taiwan Patent Application No. 106104500.
Office Action dated Jan. 25, 2018 for Chinese patent application No. 20158005146.4.
Office Action dated Oct. 19, 2017 for Taiwan patent Application No. 106104501.
Optical Society of America, Kuzyk et al, "Theory of Molecular Nonlinear Optics", pp. 5, 4-82, Department of Physics and Astronomy, Washington State University, Pullman, Washington 99164-2814, USA, Mar. 26, 2013.
Philosophical Transactions of the Royal Society, SIMON, "Charge storage mechanism in nanoporous carbons and its consequence for electrical double layer capacitors" pp. 3457-3467; Drexel University, Philadelphia, PA 19104, 2010.
R. J. Baker and B. P. Johnson, "stacking power MOSFETs for use in high speed instrumentation", Department of Electrical Engineering, University of Nevada, Reno, Reno. Nevada 89557-0030; pp. 5799-5801 Aug. 3, 1992.
Roger D. Hartman and Herbert A. Pohl, "Hyper-electronic Polarization in Macromolecular Solids", Journal of Polymer Science: Part A-1, vol. 6, pp. 1135-1152 (1968).
RSC Publishing, Akl et al., "Molecular materials for switchable nonlinear optics in the solid state, based on ruthenium-nitrosyl complexes", pp. 3518-3527, Porto Alegre, Brazil; May 24, 2013.
Search Report and Written Opinion dated Feb. 7, 2018 for Singapore Patent Application No. 11201609435W.
Taiwan Office Action for TW Application No. 106104501, dated Oct. 19, 2017.
Trevethan, Thomas et al. "Organic Molecules Reconstruct Nanostructures on Ionic Surfaces." Small (2011), vol. 7, No. 9, pp. 1264-1270.
U.S. Appl. No. 14/719,072, to Pavel Ivan Lazarev, filed May 21, 2015.
U.S. Appl. No. 14/752,600, to Matthew R. Robinson, et al., filed Jun. 26, 2015.
U.S. Appl. No. 14/919,337, to Paul T. Furuta, et al., filed Oct. 21, 2015.
U.S. Appl. No. 14/931,757, to Pavel Ivan Lazarev, et al., filed Nov. 3, 2015.
U.S. Appl. No. 15/043,186, to Paul T. Furuta, et al., filed Feb. 12, 2016.
U.S. Appl. No. 15/043,209, to Paul T. Furuta, et al., filed Feb. 12, 2016.
U.S. Appl. No. 15/043,247, to Barry K Sharp, et al., filed Feb. 12, 2016.
U.S. Appl. No. 15/043,315, to Ian S.G. Kelly-Morgan, filed Feb. 12, 2014.
U.S. Appl. No. 15/043,315, to Ivan S.G. Kelley-Morgan, filed Feb. 12, 2016.
U.S. Appl. No. 15/053,943, to Pavel Ivan Lazarev, et al., filed Mar. 14, 2016.
U.S. Appl. No. 15/090,509, to Pavel Ivan Lazarev, et al., filed Mar. 4, 2016.
U.S. Appl. No. 62/121,328, to Pavel Ivan Lazarev et al., filed Feb. 26, 2015.
U.S. Appl. No. 62/294,949, to Pavel Ivan Lazarev, et al., filed Feb. 12, 2016.
U.S. Appl. No. 62/294,955, to Pavel Ivan Lazarev, et al., filed Feb. 12, 2016.
U.S. Appl. No. 62/294,964, to Pavel Ivan Lazarev, et al., filed Feb. 12, 2016.
U.S. Appl. No. 62/318,134, to Pavel Ivan Lazarev, et al., filed Mar. 4, 2016.
Updated Notice of Allowance for U.S. Appl. No. 14/710,480, dated Jan. 17, 2018.
Warmerdam, T. W. et al. "Discotic Liquid Crystals. Physical Parameters of some 2, 3, 7, 8, 12, 13-hexa(alkanoyloxy) truxenes: Observation of a Reentrant Isotropic Phase in a Pure Disk-like mesogen." Liquid Crystals (1988), vol. 3, No. 8, pp. 1087-1104.
Yue Wang, et. al., "Morphological and Dimensional Control via Hierarchical Assembly of Doped Oligoaniline Single Crystals", J. Am. Chem. Soc. 2012, 134, pp. 9251-9262.

\* cited by examiner

COILED CAPACITOR

CLAIM OF PRIORITY

This application is a continuation of U.S. patent application Ser. No. 14/752,600 filed Jun. 26, 2015, the entire contents of which are incorporated herein by reference.

BACKGROUND

Capacitors with high volumetric energy density, high operating temperature, low equivalent series resistance (ESR), and long lifetime are critical components for pulse-power, automotive, and industrial electronics. The physical characteristics of the dielectric material in the capacitor are the primary determining factors for the performance of a capacitor. Accordingly, improvements in one or more of the physical properties of the dielectric material in a capacitor can result in corresponding performance improvements in the capacitor component, usually resulting in performance and lifetime enhancements of the electronics system or product in which it is embedded. Since improvements in capacitor dielectric can directly influence product size, product reliability, and product efficiency, there is a high value associated with such improvements.

Certain improvements in capacitor dielectric materials can be considered as enabling to a particular technology application. For example, capacitors with high permittivity, high dielectric strength, low ESR, and low dielectric dissipation factor will allow high frequency or pulse-power applications to be reduced to a practical size. High temperature operation will greatly simplify next-generation electric vehicles. Improved dielectrics will enable the specific power and reliability of switching power supplies, power conditioners, and filters to be increased. Improved energy density will decrease the area presently devoted to capacitor devices on printed circuit boards, reducing the weight and size of power conditioning systems, power supplies and down-hole tools for use in oil or gas wells.

To reduce the size of a capacitor while retaining all other physical and electrical characteristics, either an increase in the capacitor dielectric constant or dielectric breakdown strength is necessary. Both are fulfilled with the development of new thin, flexible dielectrics having high voltage breakdown strength, a high dielectric constant and a low ESR loss. Some applications additionally require a stable dielectric constant with no reduction in lifetime at temperatures exceeding 150[deg.] C.

High voltage non-polar capacitors are conventionally made using a metalized polymer film that is wound into a cylindrical shape. In conventional wound capacitors, the dielectric material is typically a polymer film. Common polymer dielectric materials include polycarbonate, polyethylene terephthalate (PET, also known as polyester), polypropylene, polystyrene, and polysulfone. Polymer dielectric-based foil capacitors are generally fabricated by placing alternating sheets of polymer and metal foil in a stack and rolling the stack into a tubular shape or depositing a metal film on one side of the polymer then rolling two stacked metalized polymer films into a tubular shape. Electrical wires are connected to each metal foil. The dielectric material exists in the form of self-supporting layers that are thick enough to sustain the necessary operating voltage (typically at least 3-6 micrometers). Unfortunately, the large thickness of the polymer sheets reduces the energy storage density. Usually the dielectric constant of these capacitors changes and the lifetime is shortened at temperatures in excess of 100-150° C. due to deficiencies in the polymer material. Alternately, two polymer films coated with a thin layer of metal (usually 17-100 nanometers thick) are wound into a tubular shape to form a capacitor. The thin metal film has the advantage of clearing any short that may form if the polymer dielectric breaks down during operation. This may extend the life of the capacitor and minimize the chances of catastrophic failure of the capacitor. Conventional film capacitors do not have high energy density because the relative permittivity (also known as dielectric constant κ) of the film is relatively low, e.g., less than about 5.

Amorphous SiO2, HfO2, other metal oxides and stacks of amorphous oxides and nitrides, e.g. SiO2/Si3N4, are disclosed in prior art as dielectric materials of capacitors. A flexible substrate comprised of an insulating polymer film coated with thin metal layers on both sides of the film and a process to deposit the amorphous oxides and oxide/nitride layers on the film to produce a material that can be rolled into cylindrical shapes is also disclosed in prior art.

In the prior art the metallized film capacitors are known. These capacitors include two tightly wound sheets, wrapped around a core. Each sheet includes a dielectric layer and a metallized layer. The metallized layer does not extend to the opposing ends of the sheet leaving a non-metallized margin on opposing sides of each sheet. The ends of the roll formed from the two tightly wound sheets are sprayed with a conductive metal to form a conducting termination for the capacitor. Capacitors made in this way can be used for a variety of purposes depending upon factors such as the type of sheet material as well as the thickness and dielectric constant of the sheet. Typical materials for the sheet are, for example, oriented polypropylene or poly-(ethylene)-terephtalate. The conductive metal termination is typically applied in a vacuum metallizer and is generally comprised of aluminum, zinc or alloys thereof.

SUMMARY

The present disclosure provides a coiled capacitor which may solve a problem of the further increase of volumetric and mass density of reserved energy associated with some energy storage devices, and at the same time reduce cost of materials.

Aspects of the present disclosure include use of materials engineered to obtain 1) high permittivity, 2) high dielectric strength (also known as breakdown field $E_{BD}$) allowing high voltage, and 3) low amount of carrier substrate.

In an aspect, the present invention provides a coiled capacitor comprising a coil formed by a flexible multilayered tape, and a first terminating electrode (a first contact layer) and a second terminating electrode (a second contact layer) which are located on butts of the coil. The flexible multilayered tape contains the following sequence of layers: first metal layer, a layer of a plastic, second metal layer, a layer of energy storage material. The first metal layer forms an ohmic contact with the first terminating electrode (the first contact layer) and the second metal layer (the second contact layer) forms an ohmic contact with the second terminating electrode.

INCORPORATION BY REFERENCE

All publications, patents, and patent applications mentioned in this specification are herein incorporated by reference to the same extent as if each individual publication,

DETAILED DESCRIPTION

Figure 1A:
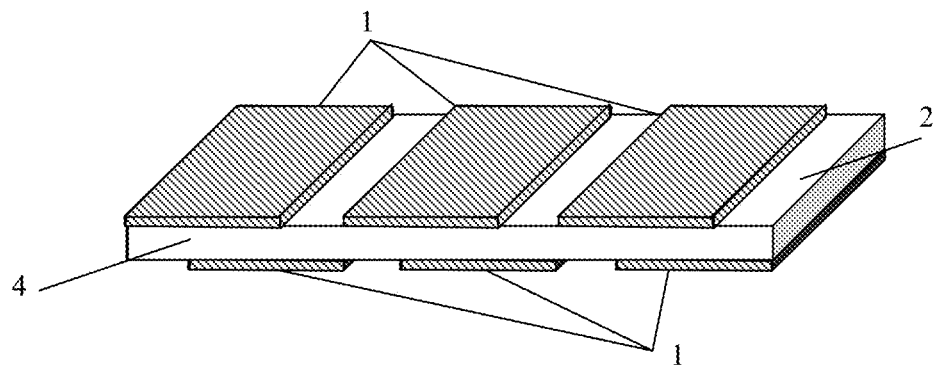
FIGS. 1a, 1b and 1c schematically show formation of sets of metal strips on top and bottom surfaces of the plastic layer.

While various aspects of the present disclosure are shown and described herein, it will be obvious to those skilled in the art that such aspects are provided by way of example only. Numerous variations, changes, and substitutions may occur to those skilled in the art without departing from the invention. It should be understood that various alternatives to the aspects described herein may be employed.

The present disclosure provides a coiled capacitor. According to one aspect of the present disclosure, the coiled capacitor further comprises a dielectric core around which the flexible multilayered tape is coiled. The energy storage material may be characterized by a dielectric constant κ greater than about 100 and a breakdown field $E_{bd}$ about greater than or equal to about 0.001 volts (V)/nanometer (nm). The dielectric constant κ may be greater than or equal to about 100, 200, 300, 400, 500, 1000, 2000, 3000, 4000, 5000, 6000, 7000, 8000, 9000, 10,000, or 100,000. The breakdown field may be greater than about 0.01 V/nm, 0.05 V/nm, 0.1 V/nm, 0.2 V/nm, 0.3 V/nm, 0.4 V/nm, 0.5 V/nm, 1 V/nm, or 10 V/nm. By way of example, and not by way of limitation, the energy storage material may be characterized by a dielectric constant κ between about 100 and about 1,000,000 and a breakdown field $E_{bd}$ between about 0.01 V/nm and about 2.0 V/nm. By way of example, and not by way of limitation, the energy storage material may comprise rylene fragments. According to another aspect of the present disclosure, the rylene fragments may be selected from the list comprising structures 1-21 as given in Table 1.

TABLE 1

Examples of the energy storage material comprising the rylene fragments:

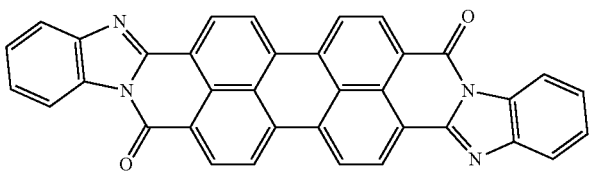 [SMILES: O=c1c2ccc3c4ccc5c6c(ccc(c7ccc(c2c37)c2nc3ccccc3n12)c46)c(=O)n1c2ccccc2nc51]

1

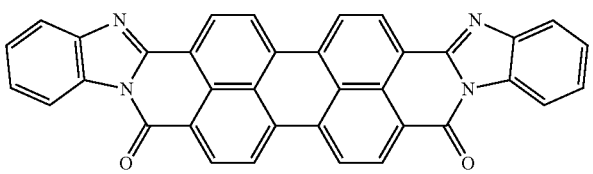 [SMILES: O=c1c2ccc3c4ccc5c(=O)n6c7ccccc7nc6c6ccc(c7ccc(c2c37)c2nc3ccccc3n12)c4c56]

2

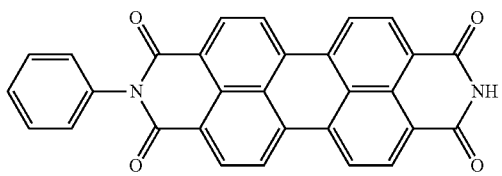 [SMILES: O=C1NC(=O)c2ccc3c4ccc5c6c(ccc(c7ccc1c2c73)c64)C(=O)N(c1ccccc1)C5=O]

3

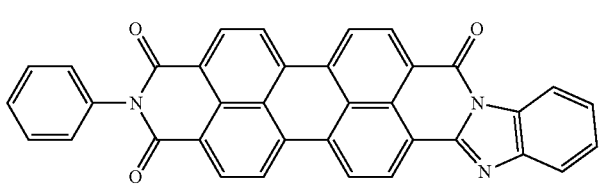 [SMILES: O=C1c2ccc3c4ccc5c(=O)n6c7ccccc7nc6c6ccc(c7ccc(c2c37)C(=O)N1c1ccccc1)c4c56]

4

TABLE 1-continued
Examples of the energy storage material comprising the rylene fragments:
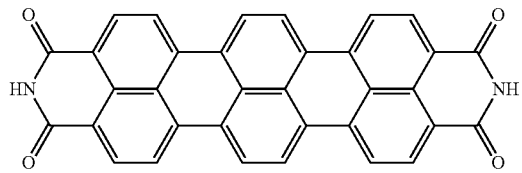 [SMILES: O=C1NC(=O)c2ccc3c4ccc5c6ccc7c8c(ccc(c9ccc(c%10ccc1c2c%103)c4c95)c86)C(=O)NC7=O] 5
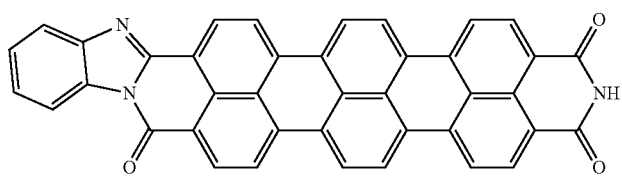 [SMILES: O=C1NC(=O)c2ccc3c4ccc5c6ccc7c8c(ccc(c9ccc(c%10ccc1c2c%103)c4c95)c68)c(=O)n1c2ccccc2nc71] 6
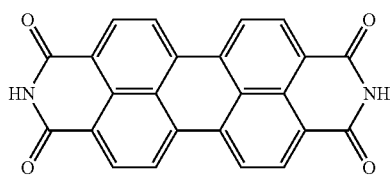 [SMILES: O=C1NC(=O)c2ccc3c4ccc5c6c(ccc(c7ccc1c2c73)c64)C(=O)NC5=O] 7
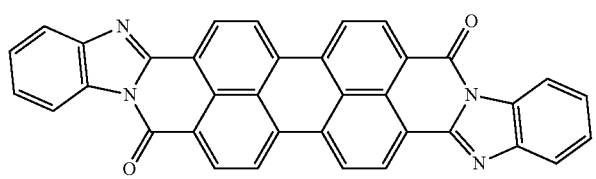 [SMILES: O=c1c2ccc3c4ccc5c6c(ccc(c7ccc(c2c37)c2nc3ccccc3n12)c46)c(=O)n1c2ccccc2nc51] 8
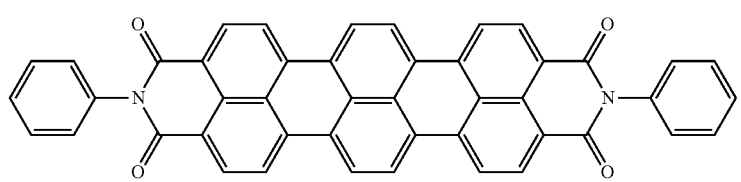 [SMILES: O=C1c2ccc3c4ccc5c6ccc7c8c(ccc(c9ccc(c%10ccc(c2c3%10)C(=O)N1c1ccccc1)c4c59)c86)C(=O)N(c1ccccc1)C7=O] 9
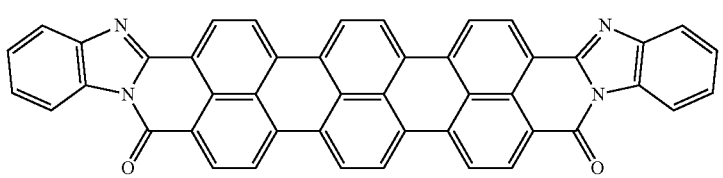 [SMILES: O=c1c2ccc3c4ccc5c6ccc7c(=O)n8c9ccccc9nc8c8ccc(c9ccc(c%10ccc(c2c3%10)c2nc3ccccc3n12)c4c59)c6c78] 10
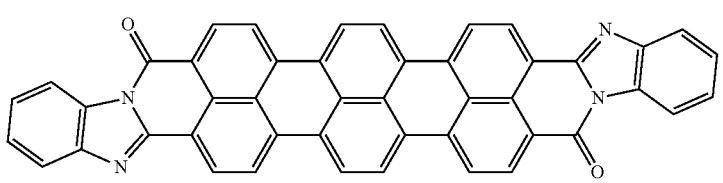 [SMILES: O=c1c2ccc3c4ccc5c6ccc7c8c(ccc(c9ccc(c%10ccc(c2c3%10)c2nc3ccccc3n12)c4c95)c68)c(=O)n1c2ccccc2nc71] 11
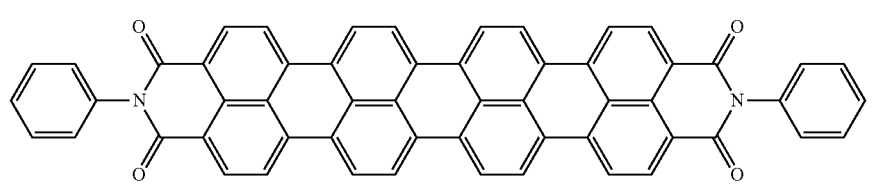 [SMILES: O=C1c2ccc3c4ccc5c6ccc7c8ccc9c%10c(ccc(c%11ccc(c%12ccc(c%13ccc(c2c3%13)C(=O)N1c1ccccc1)c4c5%12)c6c7%11)c%108)C(=O)N(c1ccccc1)C9=O] 12

TABLE 1-continued
Examples of the energy storage material comprising the rylene fragments:
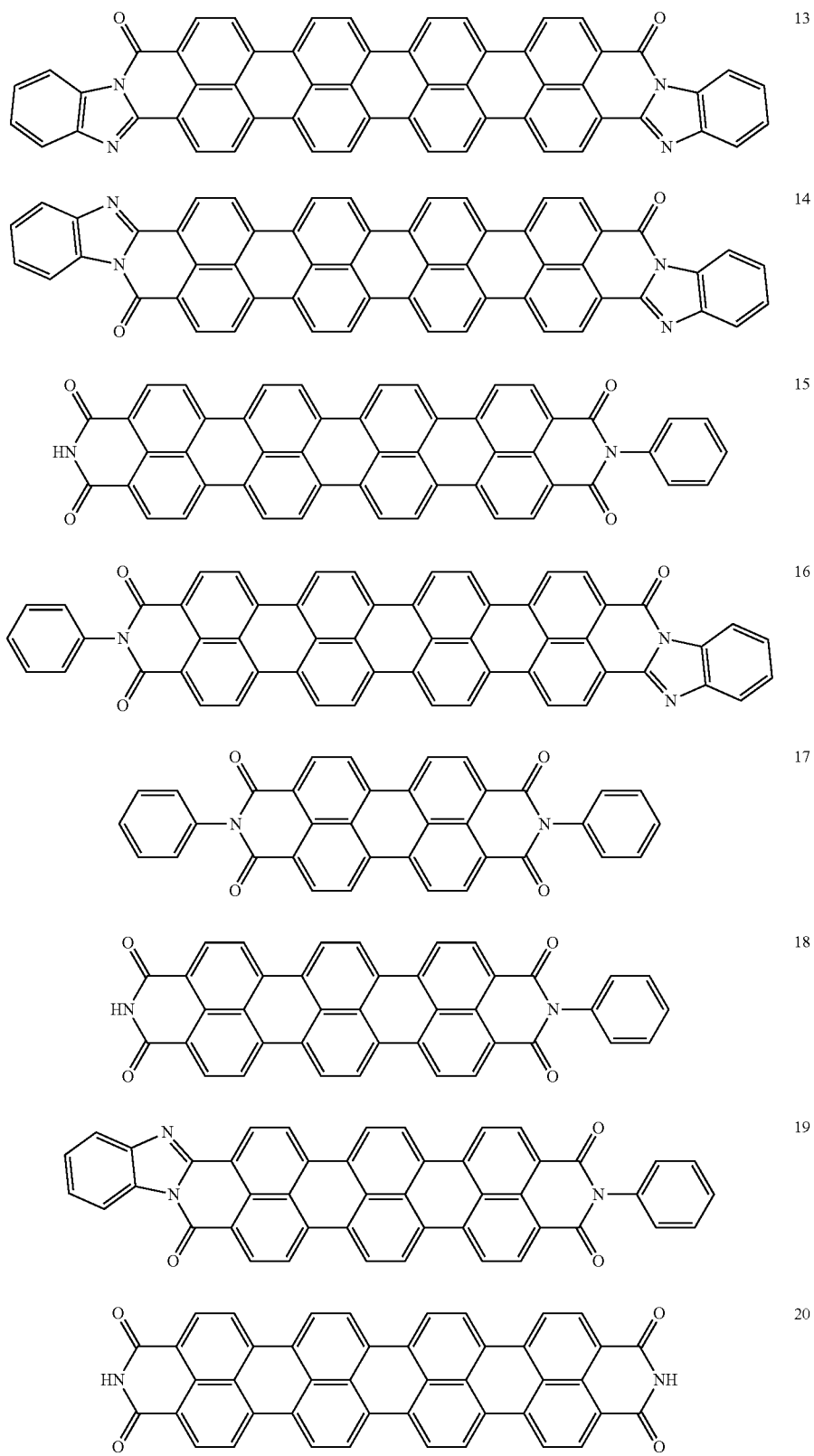

TABLE 1-continued

Examples of the energy storage material comprising the rylene fragments:

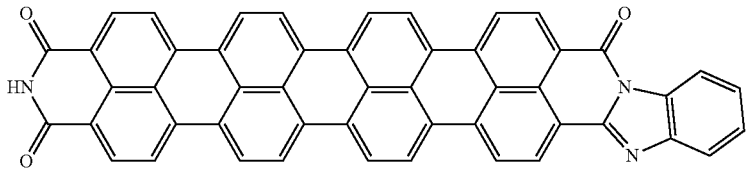

21

In one example of a coiled capacitor in accordance with aspects of the present disclosure, the energy storage material is selected from the list comprising doped oligoaniline and p-oligo-phenylene. In another example of a coiled capacitor, the doped oligoaniline is self-doped oligoaniline with $SO_3$-groups or COO-groups on the phenyl rings of aniline. In still another embodiment of the coiled capacitor, the doped oligoaniline is mix-doped by organic structure-inorganic/organic acid mixed to oligoaniline in oxidized state, wherein the organic structure is selected from the list comprising alkyl, aryl and polymers thereof and the inorganic/organic acid is selected from the list comprising $SO_3H$, COOH, HCl, $H_2SO_4$, $H_3PO_4$, $HBF_4$, $HPF_6$, benzoic acid and derivatives thereof. According to still another aspect of the present disclosure, the energy storage material may comprise a polymeric material soluble in organic solvents. In yet another embodiment of the present invention, the energy storage material comprises polymers soluble in organic solvents having a structure selected from the structures 22 to 27 as given in Table 2.

TABLE 2

Examples of the energy storage material comprising the polymers soluble in organic solvents

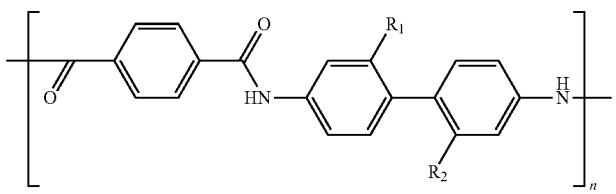

22

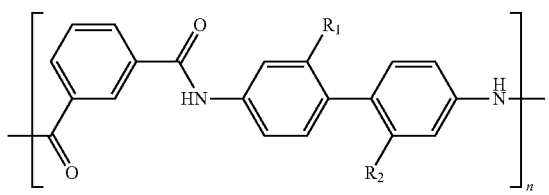

23

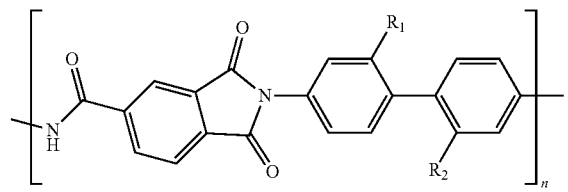

24

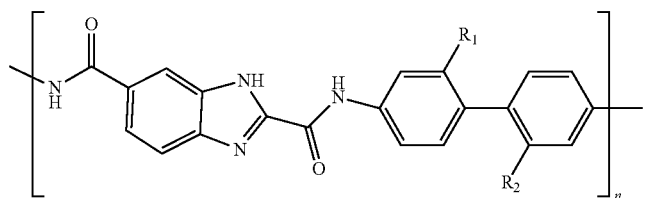

25

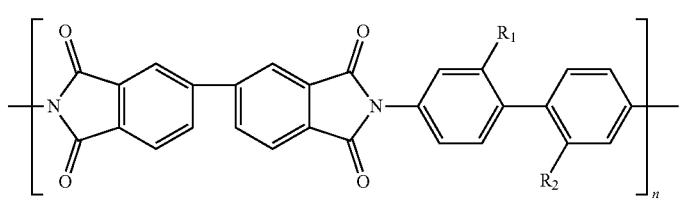

26

TABLE 2-continued

Examples of the energy storage material comprising the polymers soluble in organic solvents

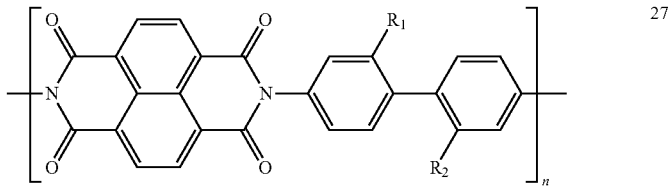

27 wherein each $R_1$ and $R_2$ is independently selected from alkyl, aryl, substituted alkyl, and substituted aryl. In another embodiment of the coiled capacitor, the energy storage material comprises a colloidal composite with a dispersion of electro-conductive anisometric particles in an insulator matrix. In still another example of a coiled capacitor, the electro-conductive anisometric particles comprise an electro-conductive oligomer. In yet another example of the coiled capacitor, the material of the insulator matrix is selected from the group consisting of poly (acrylic acid) (PAA), poly(N-vinylpyrrolidone) (PVP), poly(vinylidene fluoride-hexafluoropropylene) [P(VDF-HFP)], ethylene propylene polymers, which include ethylene propylene rubber (EPR) and ethylene propylene diene monomer (EPDM), and silicone rubber (PDMSO) such as dimethyldicloro siloxane, dimethylsilane diol, and polydimethyl siloxane, polystyrene sulfonic acid (PSS). In one embodiment of the coiled capacitor, the energy storage material comprises a surfactant selected from: dodecylbenzene sulfonate (DBSA), polyoxyethylene glycol alkyl ethers, polyoxypropylene glycol alkyl ethers, polyoxyethylene glycol octylphenol ethers, polyoxyethylene glycol sorbitan alkyl esters, sorbitan alkyl esters, and dobecyldimethylamine oxide.

In another embodiment of the coiled capacitor, the energy storage material comprises ceramic slurries, sputtered thin films, and molecularly ordered crystals. As used herein the term molecularly ordered crystals refers to films assembled by cascade crystallization or films made from solutions comprising lyotropic liquid crystals. Examples of molecularly ordered crystals include, but are not limited to, energy storage molecular materials that are described, e.g., in U.S. patent application Ser. No. 14/719,072, filed May 21, 2015, the entire contents of which are incorporated herein by reference. By way of example, and not by way of limitation, a method for making molecularly ordered crystals from a colloidal system with supramolecular complexes may include the following steps:
  application of the colloidal system onto a substrate. The colloidal system typically possesses thixotropic properties, which are provided by maintaining a preset temperature and a certain concentration of the dispersed phase;
  external alignment upon the system, which can be produced using mechanical factors or by any other means, for example by applying an external electric field at normal or elevated temperature, with or without additional illumination, magnetic field, or optical field (e.g., coherent photovoltaic effect); the degree of the external alignment should be sufficient to impart necessary orientation to the kinetic units of the colloidal system and form a structure, which serves as a base of the crystal lattice of the crystal dielectric layer; and
  drying to remove solvents to form the final molecularly ordered crystal.

In still another example of the coiled capacitor, the plastic is selected from the list comprising polypropylene (PP), polyethylene terephthalate polyester (PET), polyphenylene sulfide (PPS), polyethylene naphthalate (PEN), polycarbonate (PP), polystyrene (PS), and polytetrafluoroethylene (PTFE). In yet another embodiment of the coiled capacitor, the thickness of the plastic layer cannot be less than 2 μm. In still another embodiment of the coiled capacitor, the thickness of the plastic layer varies from 2.5 μm to 52 μm. In one example of the coiled capacitor, the plastic layer comprises polypropylene and the thickness of the plastic layer is equal to 12 μm. In another example of the coiled capacitor, the material of the first metal layer and second metal layer independently selected from the list comprising Pt, Cu, Al, Ag, Au, Ni, and Al:Ni, and the metal foam. In still another example of the coiled capacitor, the thickness of the first and second contact layers independently varies from 10 nm to 1000 nm. In one embodiment of the coiled capacitor, the sheet resistance of the first and second contact layers independently cannot be less than 0.1 Ohm/Square. In another example of the coiled capacitor, the sheet resistance of the first and second contact layers independently varies from 0.1 Ohm/Square to 2.5 Ohm/Square. In yet another example of the coiled capacitor, the metal of the metal foam is selected from the list comprising Al, Ni, Fe, Cu. In one example of the coiled capacitor, the melting temperature of the metal foam is in the range 400 C-700 C. In another example of the coiled capacitor, the metal content in the metal foam for electrode is in the range of 5% up to 30% by weight. In still another example of the coiled capacitor, the metal foam is of closed "bubble" type with maximum conductance per metal content. In yet another example of the coiled capacitor, the size of "bubbles" is in the range of 100 nm up to 100 000 nm. In one example of the coiled capacitor, the material of the first terminating electrode and second terminating electrode independently selected from the list comprising Pt, Cu, Al, Ag, and Au. In another embodiment of the coiled capacitor, the first metal layer is deposited on a portion of a first surface of the plastic layer and this first surface has a first margin portion which is free of deposited metal, and wherein the second metal layer is deposited on a portion of a second surface of the plastic layer and this second surface has a second margin portion which is free of deposited metal and is located on an opposite edge of the plastic layer from the first margin portion.

According to additional aspects of the present disclosure, the energy storage material may include supramolecules or stacks of molecules. Such supramolecules may be formed by self-assembling molecules that stack in rod like molecular structures. Examples of such structures include, but are not limited to, structures selected from the list comprising structures as given in Table 1 and also structures 28-62 as given in Table 3.

TABLE 3
additional examples of supramolecular structures in the energy storage material
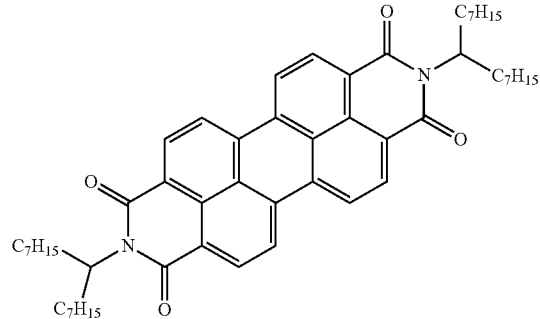
28
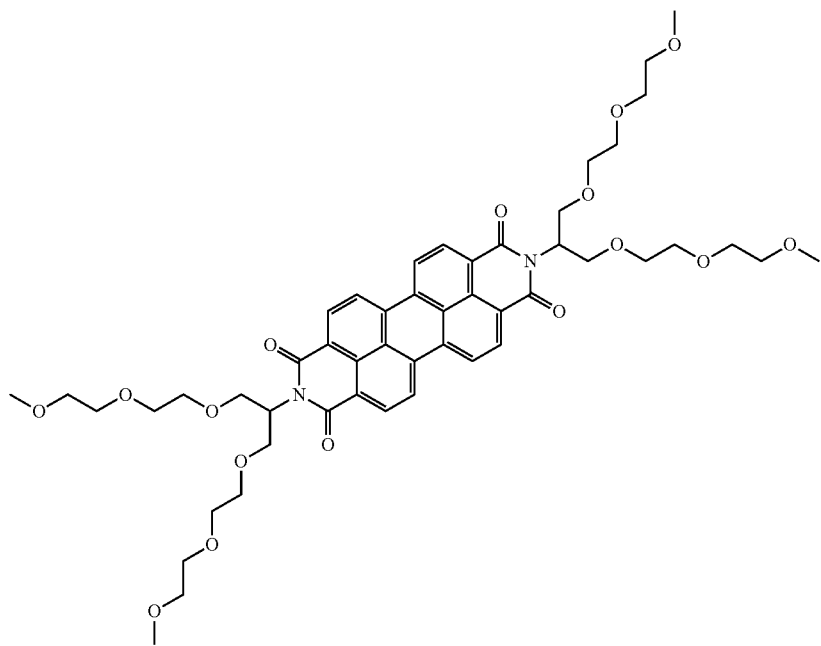
29
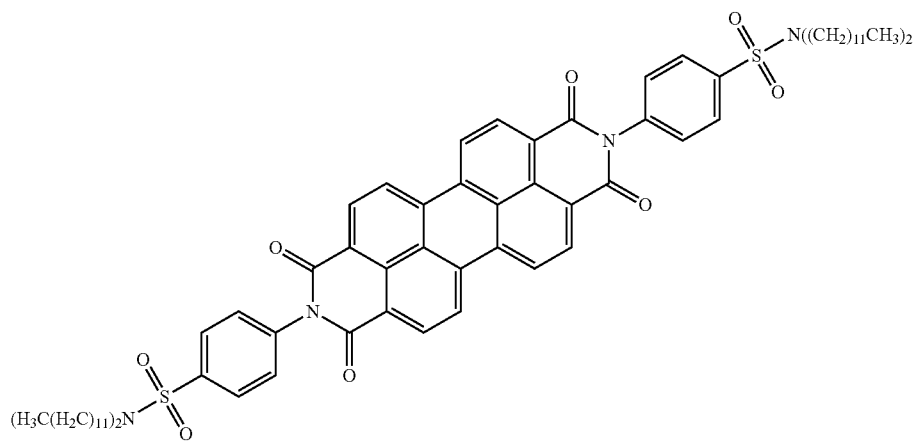
30

TABLE 3-continued
additional examples of supramolecular structures in the energy storage material
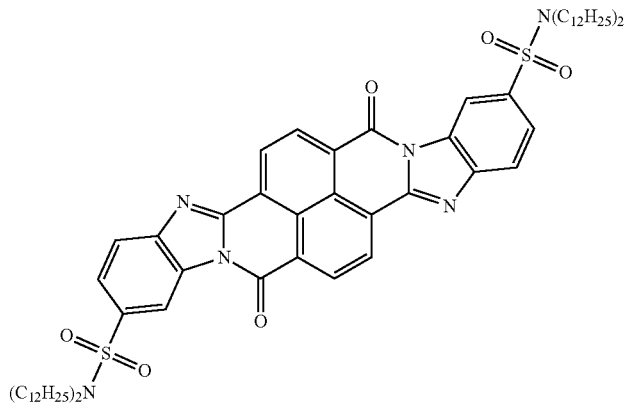  31
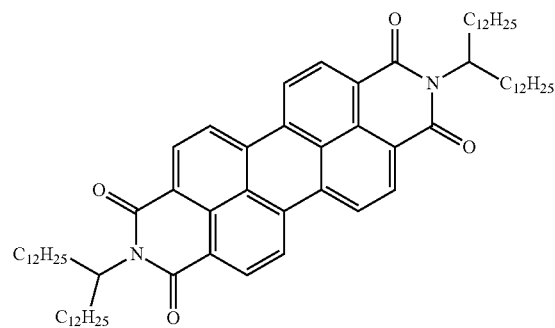  32
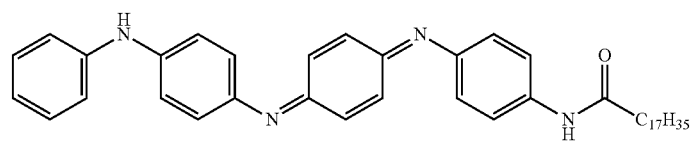  33
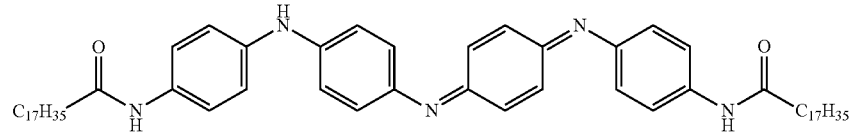  34
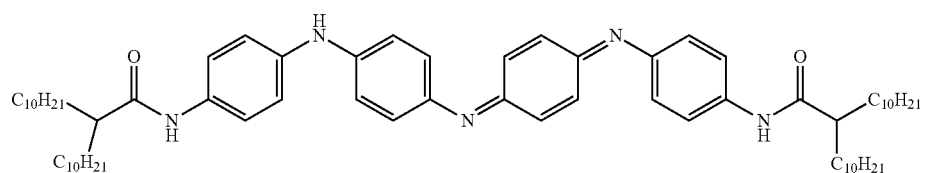  35
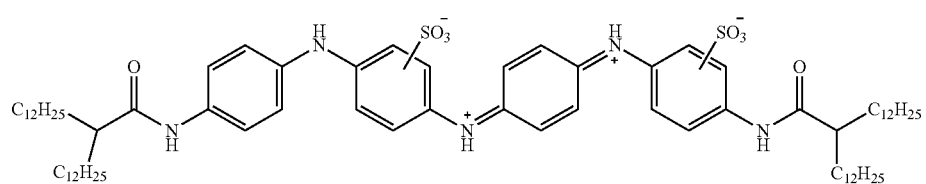  36
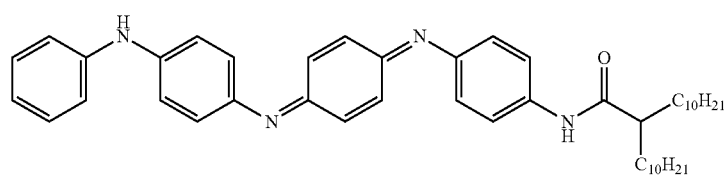  37

TABLE 3-continued
additional examples of supramolecular structures in the energy storage material
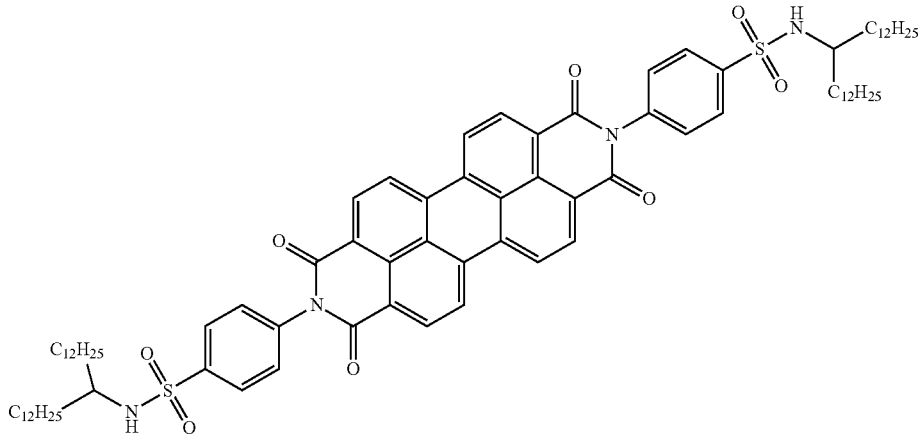
38
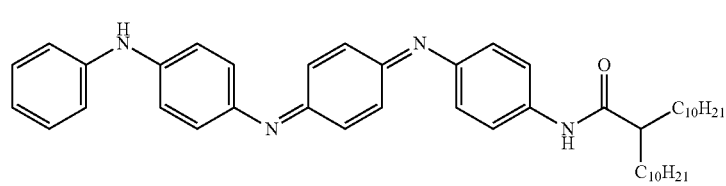
39
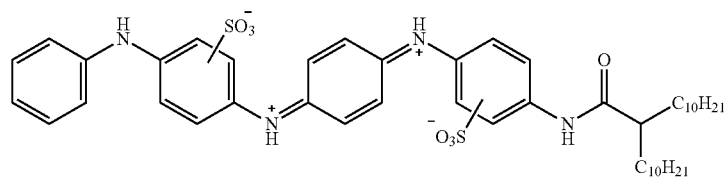
40
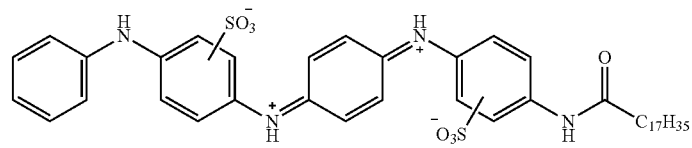
41
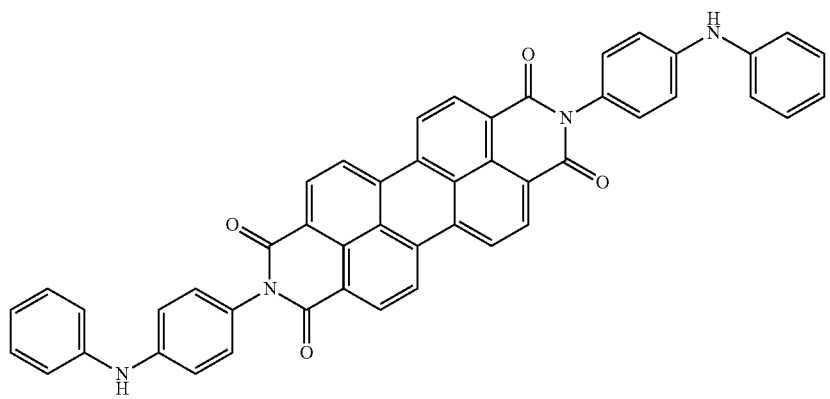 [SMILES: O=C1c2ccc3c4ccc5c6c(ccc(c7ccc(c2c37)C(=O)N1c1ccc(Nc2ccccc2)cc1)c64)C(=O)N(c1ccc(Nc2ccccc2)cc1)C5=O]
42

TABLE 3-continued
additional examples of supramolecular structures in the energy storage material
43
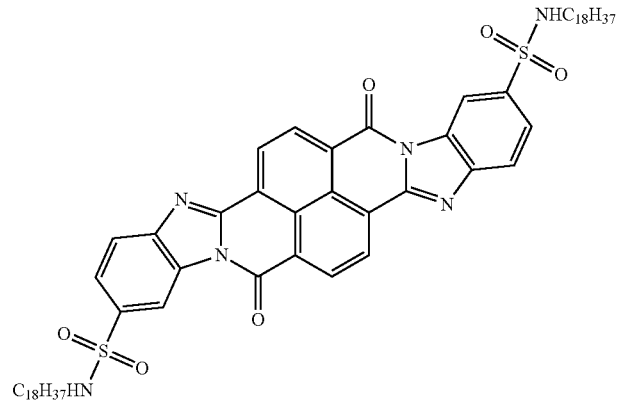
44
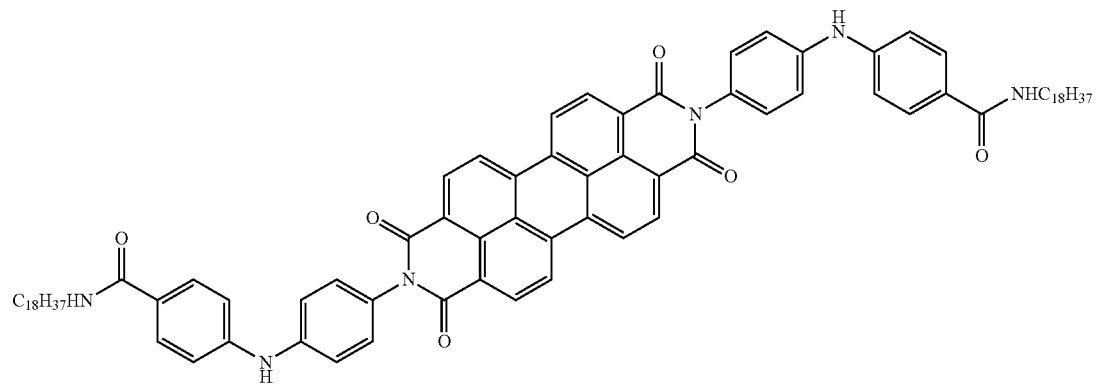
45
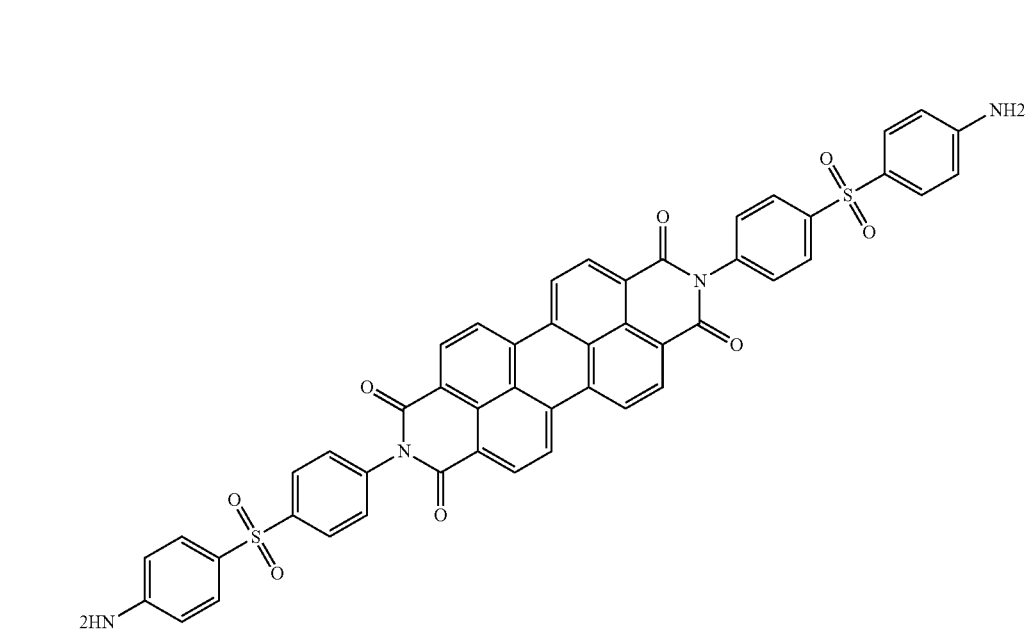

TABLE 3-continued
additional examples of supramolecular structures in the energy storage material
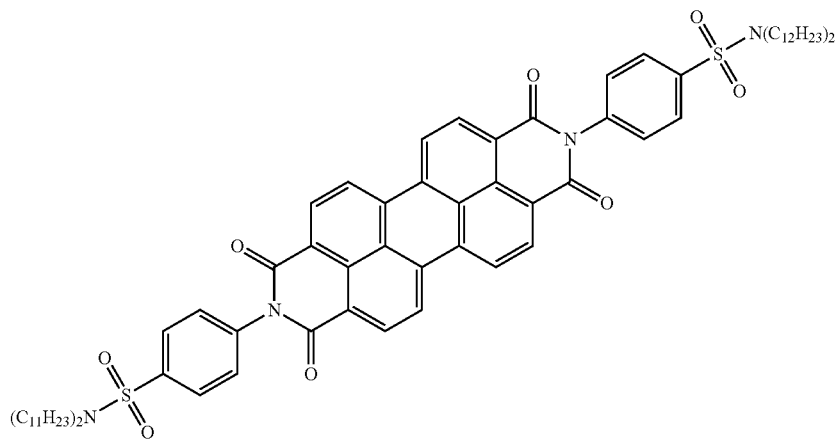
46
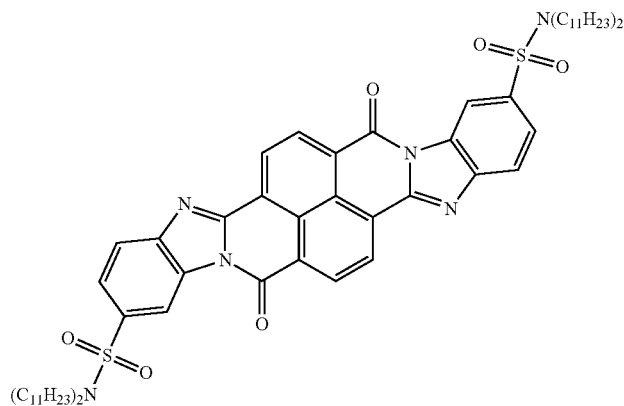
47
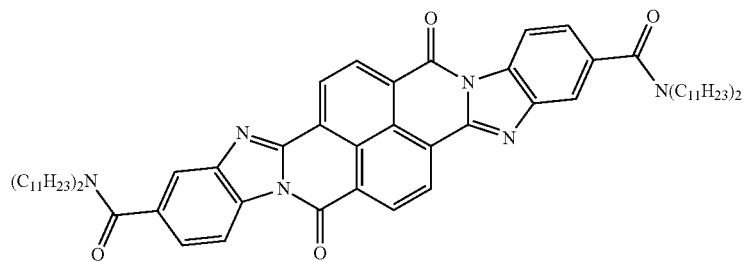
48
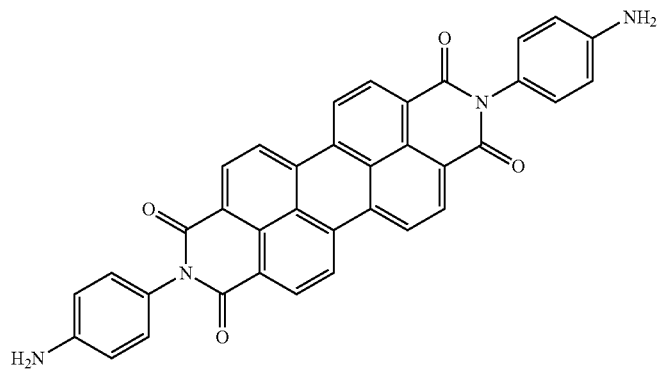 [SMILES: Nc1ccc(N2C(=O)c3ccc4c5ccc6c7c(ccc(c8ccc(c3c48)C2=O)c75)C(=O)N(c2ccc(N)cc2)C6=O)cc1]
49

TABLE 3-continued
additional examples of supramolecular structures in the energy storage material
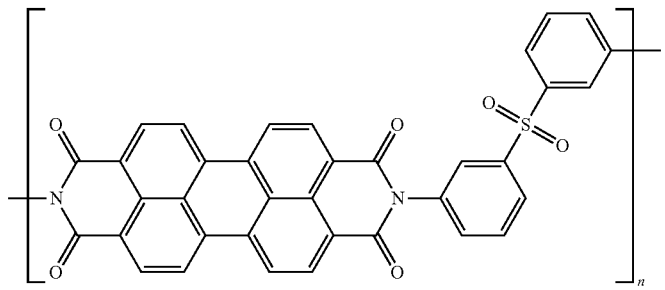
50
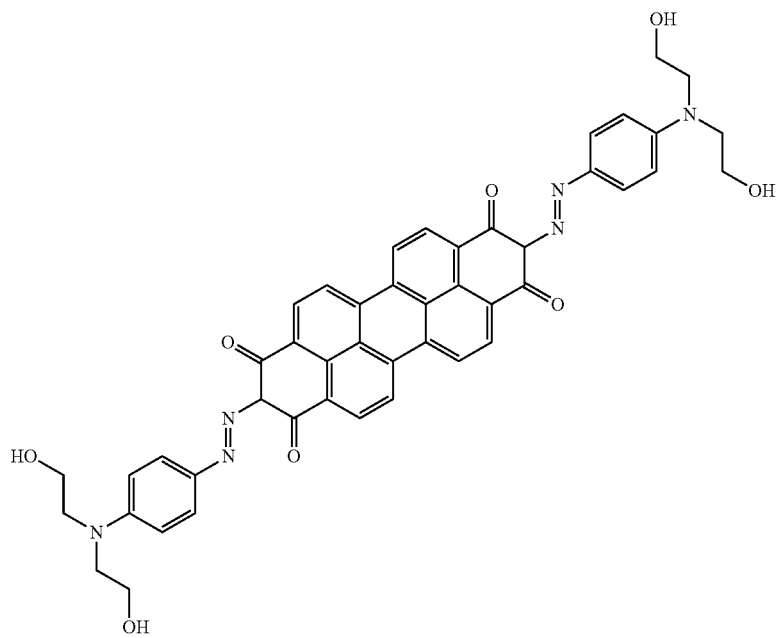 [SMILES: O=C1c2ccc3c4ccc5c6c(ccc(c7ccc(c2c37)C(=O)C1/N=N/c1ccc(N(CCO)CCO)cc1)c64)C(=O)C(/N=N/c1ccc(N(CCO)CCO)cc1)C5=O]
51
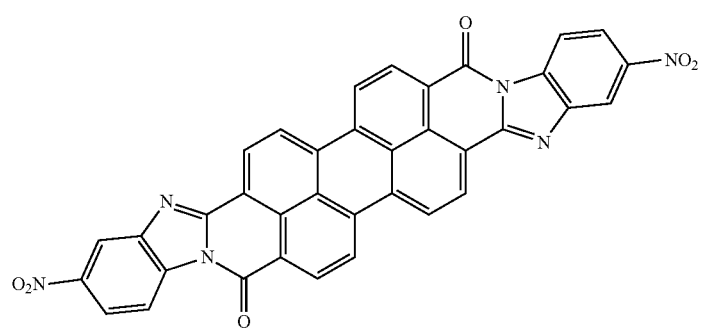 [SMILES: O=c1c2ccc3c4ccc5c6c(ccc(c7ccc(c2c37)c2nc3cc([N+](=O)[O-])ccc3n12)c46)c(=O)n1c2ccc([N+](=O)[O-])cc2nc51]
52
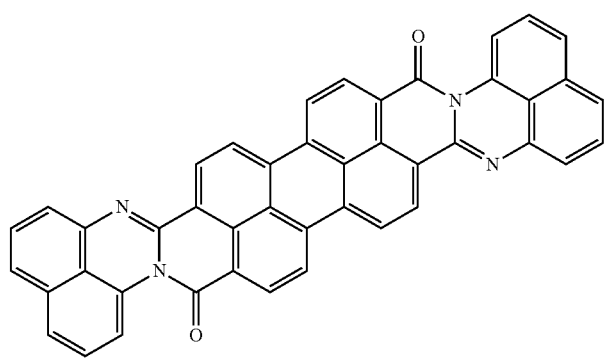 [SMILES: O=c1c2ccc3c4ccc5c6c(ccc(c7ccc(c2c37)c2nc3cccc7cccc(c73)n12)c46)c(=O)n1c2cccc3cccc(nc51)c32]
53

TABLE 3-continued
additional examples of supramolecular structures in the energy storage material
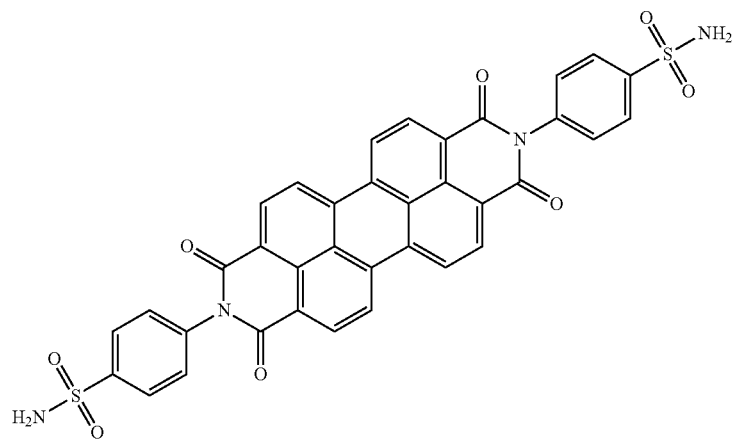 [SMILES: NS(=O)(=O)c1ccc(N2C(=O)c3ccc4c5ccc6c7c(ccc(c8ccc(c3c48)C2=O)c75)C(=O)N(c2ccc(S(N)(=O)=O)cc2)C6=O)cc1]
54
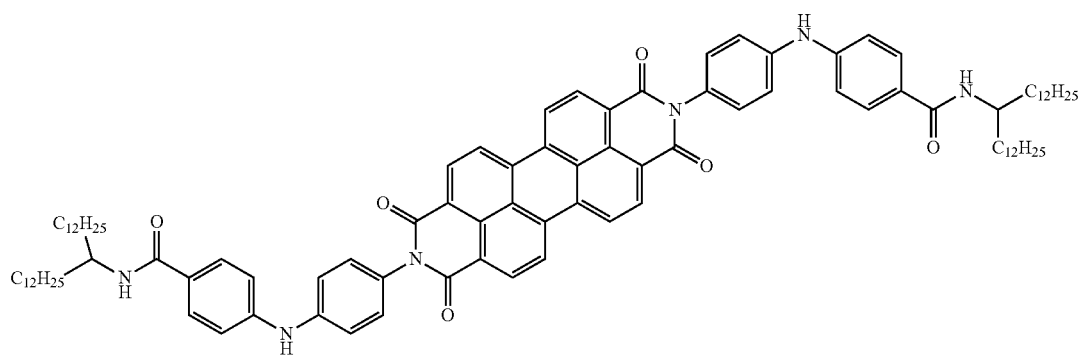
55
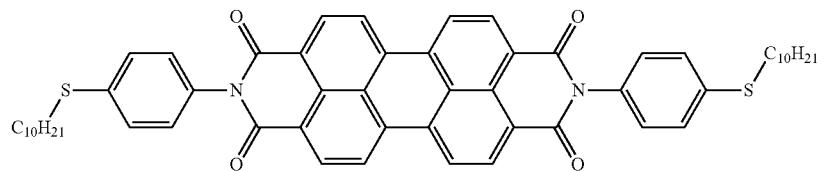
56
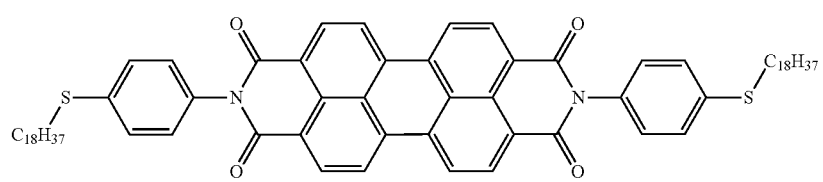
57

TABLE 3-continued
additional examples of supramolecular structures in the energy storage material
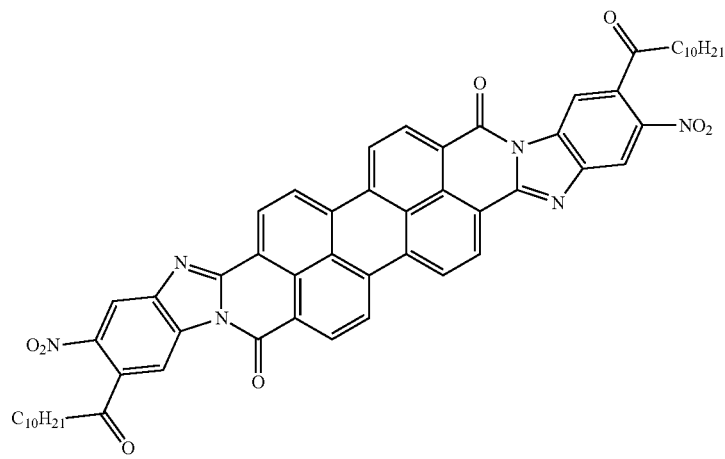
58
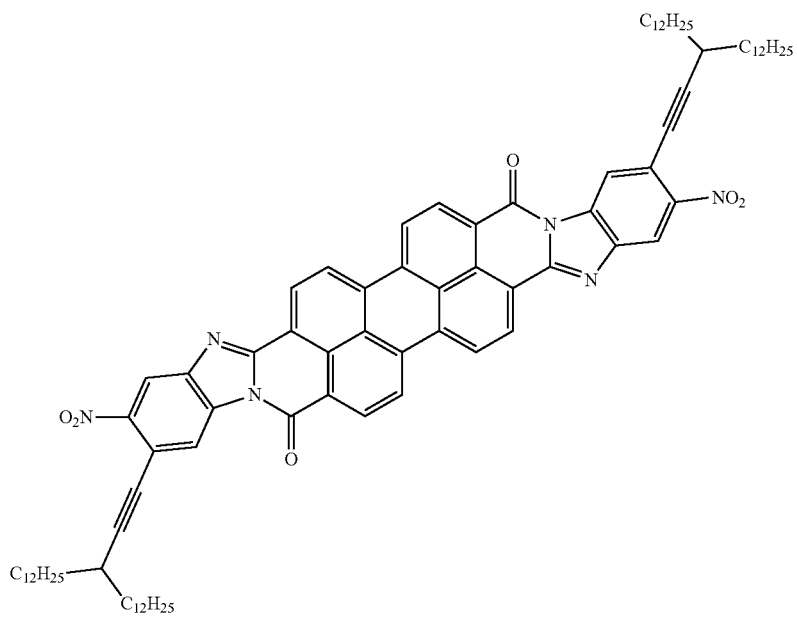
59
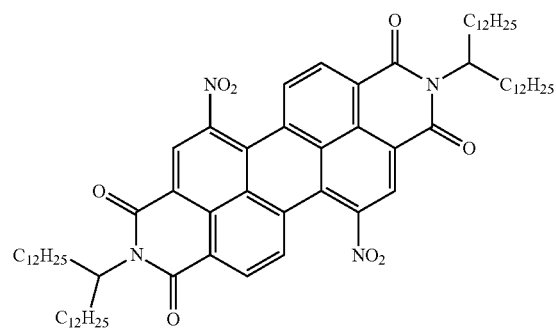
60

TABLE 3-continued additional examples of supramolecular structures in the energy storage material

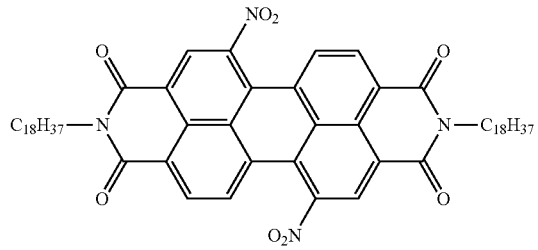

61

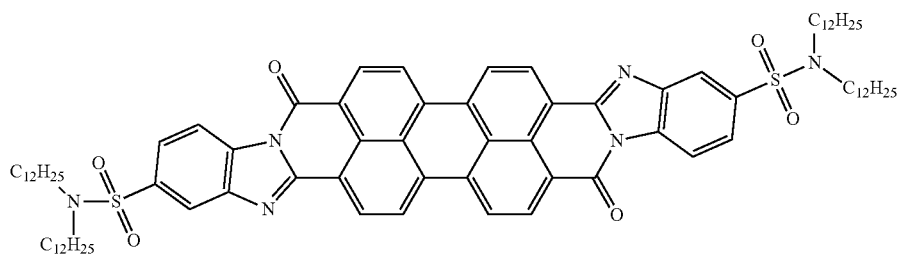

62

EXAMPLES

Example 1

Figure 1B:
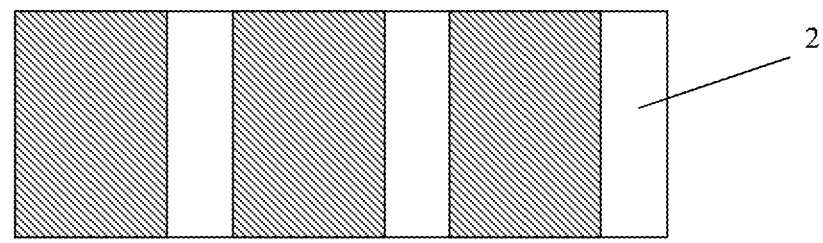
Figure 1C:
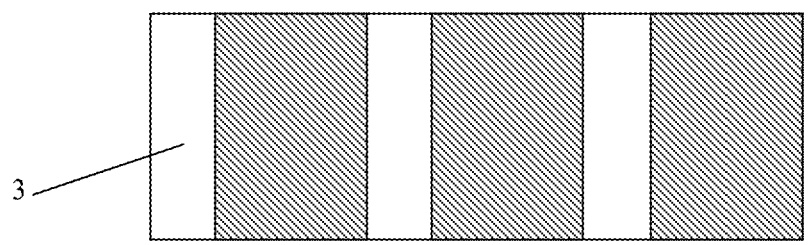

The example schematically describes a sequence of technological operations for manufacturing of a coiled capacitor in accordance with an aspect of the present disclosure. This example represents one of possible methods of manufacturing of the disclosed coiled capacitor. FIGS. 1a, 1b and 1c show formation of metal strips (1) on top (2, FIG. 1b) and bottom (3, FIG. 1c) surfaces of the plastic layer (4). FIG. 1a shows the metal strips located on the top surface are displaced relatively of the metal strips located on the bottom surface. In this Example the width of the metal strip may vary within the range from 1 cm to 100 cm. The width is not limited by the specified range of values. Generally, the desired width is computed for each application. Various factors can influence size of the width, such as roll size, power, energy, etc. The large influence on the width can render prospective application of the disclosed coiled capacitor. The thickness of the metal strip may vary within the range from 0.01 μm to 1 μm. The distance between strips may change from 0.5 mm to 3 mm. The key feature of this example is the use of one plastic layer as a load-carrying substrate for all layers in the capacitor that are coated onto this plastic layer or supported by this plastic layer.

Figure 2:
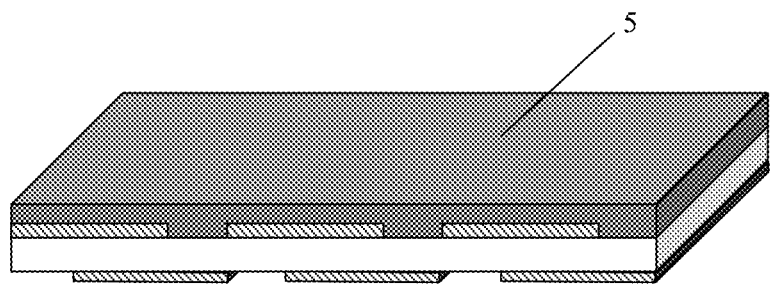
FIG. 2 shows a formation of the layer of the energy storage material on one of metalized surfaces of the plastic layer.
Figure 3:
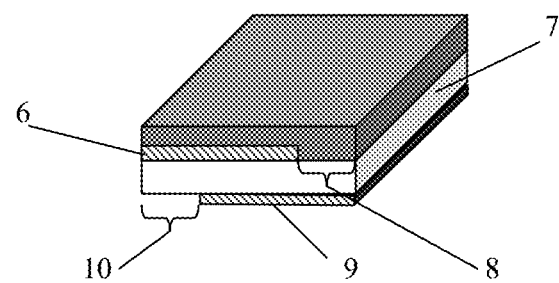
FIG. 3 shows a slitting of the intermediate product onto the multilayered tapes.
Figure 4:
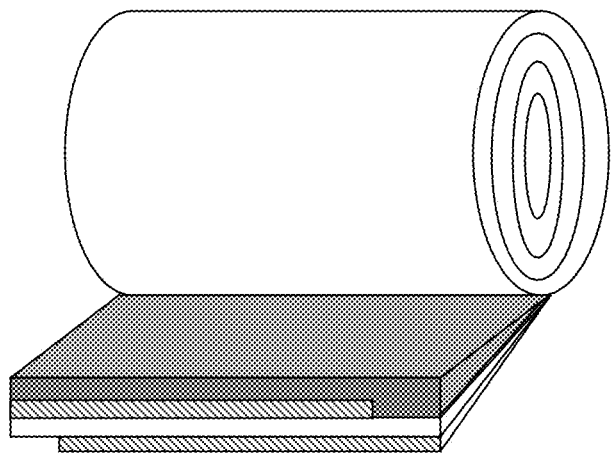
FIG. 4 shows a winding of the multilayered tape.
Figure 5:
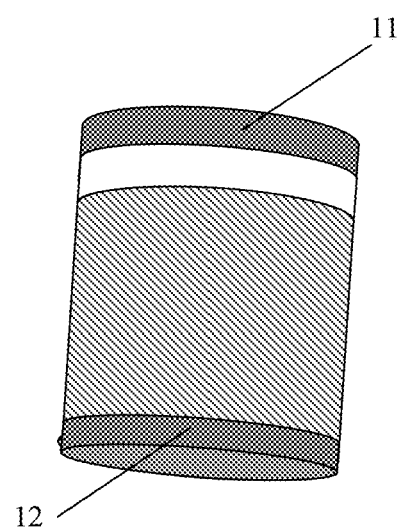
FIG. 5 shows a formation of the first terminating electrode and a second terminating electrode.

Metal strips are formed onto opposite surfaces of the plastic layer so that margin portions which are free of deposited metal have been generated on each surface of the plastic layer and these margin portions are located on an opposite edge of the plastic layer. The following stage is formation of the layer of the energy storage material on one of metalized surfaces of the plastic layer shown in FIG. 2. This formation comprises two steps: first step is application of a solution of the energy storage material and second step comprises a drying the applied solution to form a solid layer of the energy storage material (5). The thickness of the layer of the energy storage material may vary within the range from 0.5 μm to 50 μm. Thus at this stage an intermediate product for the further formation of the coiled capacitor is formed. Then, a slitting of the intermediate product onto the multilayered tapes is made. The schematic view of the received multilayered tape is shown in the FIG. 3. FIG. 3 shows that the first metal layer (6) is deposited on a portion of a first surface of the plastic layer (7) and this first surface has a first margin portion (8) which is free of deposited metal, and wherein the second metal layer (9) is deposited on a portion of a second surface of the plastic layer (7) and this second surface has a second margin portion (10) which is free of deposited metal and is located on an opposite edge of the plastic layer from the first margin portion. Further a winding of the multilayered tape is carried out (see, FIG. 4). Then the first terminating electrode (a first contact layer) (11) and a second terminating electrode (a second contact layer) (12) located on butts of the coil are formed (see, FIG. 5). Finally, a healing is done by applying a precisely calibrated voltage across the first and second terminating electrodes of the coiled capacitor so that any existing defects will be "burned away".

Example 2

Figure 6:
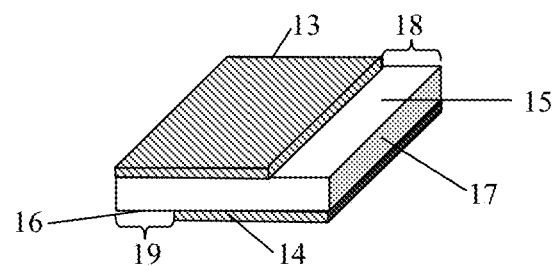
FIG. 6 shows a formation of two metal strips on top and bottom surfaces of the plastic layer according to the second embodiment.

This example schematically describes another sequence of technological operations for manufacturing of the coiled capacitor. FIG. 6 shows formation of two metal strips (13) and (14) on top (15) and bottom (16) surfaces of a plastic layer (17). FIG. 6 shows the metal strip located on the top surface is displaced laterally relative to the metal strip located on the bottom surface. Thus, the first metal strip (13) is deposited on a portion of a first surface of the plastic layer (15) and this first surface has a first margin portion (18) which is free of deposited metal, and wherein the second metal strip (14) is deposited on a portion of a second surface of the plastic layer (16) and this second surface has a second margin portion (19) which is free of deposited metal and is located on an opposite edge of the plastic layer from the first margin portion. The thickness of the plastic layer varies from 2.5 µm to 52 µm. The width of a metal strip may vary within the range from 1 cm to 100 cm and its thickness may vary within the range from 0.01 µm to 1 µm. The plastic layer is used as a load-carrying substrate for all other layers in the capacitor that are coated onto this plastic layer or supported by this plastic layer.

Figure 7:
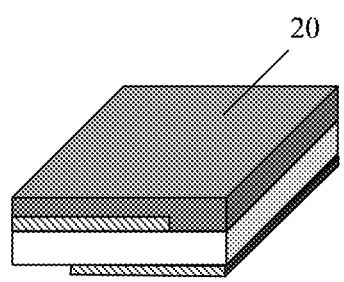
FIG. 7 shows a formation of the layer of the energy storage material.
Figure 8:
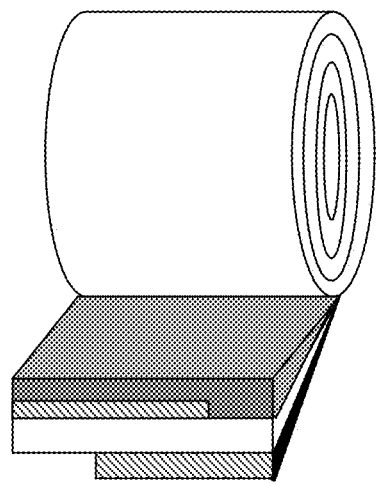
FIG. 8 shows a winding of the multilayered tape.
Figure 9:
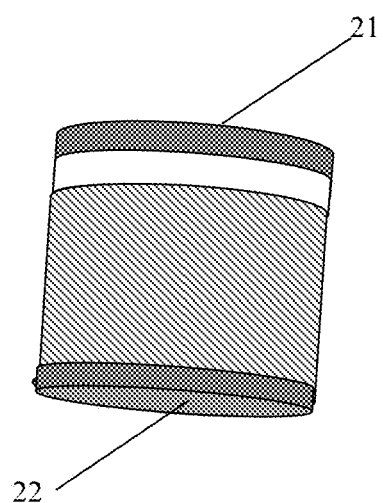
FIG. 9 shows a formation of the first terminating electrode and a second terminating electrode.

The following stage is formation of the layer of the energy storage material (20) on one of metalized surfaces of the plastic layer shown in FIG. 7. This formation comprises two steps: first step is application of solution of the energy storage material and second step comprises a drying to form a solid layer of the energy storage material (20). Thickness of the layer of the energy storage material may vary within the range from 0.5 µm to 50 µm. Further a winding of the multilayered tape into a roll is carried out (see, FIG. 8). Then the first terminating electrode (a first contact layer) (21) and a second terminating electrode (a second contact layer) (22) located on butts of the coil are formed (see, FIG. 9). Finally, a healing is done by applying a precisely calibrated voltage across the first and second terminating electrodes of the coiled capacitor so that any existing defects will be "burned away".

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. As used herein, in a listing of elements in the alternative, the word "or" is used in the logical inclusive sense, e.g., "X or Y" covers X alone, Y alone, or both X and Y together, except where expressly stated otherwise. Two or more elements listed as alternatives may be combined together. The appended claims are not to be interpreted as including means-plus-function limitations, unless such a limitation is explicitly recited in a given claim using the phrase "means for."

What is claimed is:

1. A coiled capacitor comprising
   a coil formed by a flexible multilayered tape, and
   a first terminating electrode and a second terminating electrode which are located on butts of the coil,
   wherein the flexible multilayered tape contains the following sequence of layers: first metal layer, a layer of a plastic, second metal layer, a layer of energy storage material,
   wherein the first metal layer forms ohmic contact with the first terminating electrode and the second metal layer forms ohmic contact with the second terminating electrode, and
   wherein the energy storage material comprises a material that includes one or more supramolecular structures selected from the list consisting of structures 28-62:

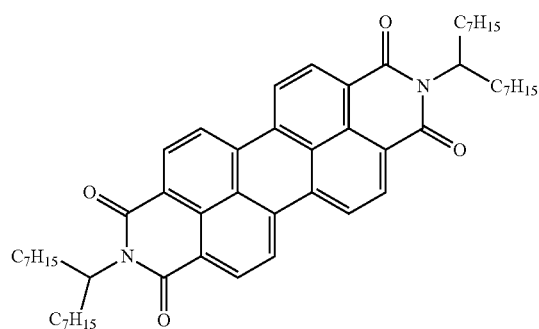

28

-continued
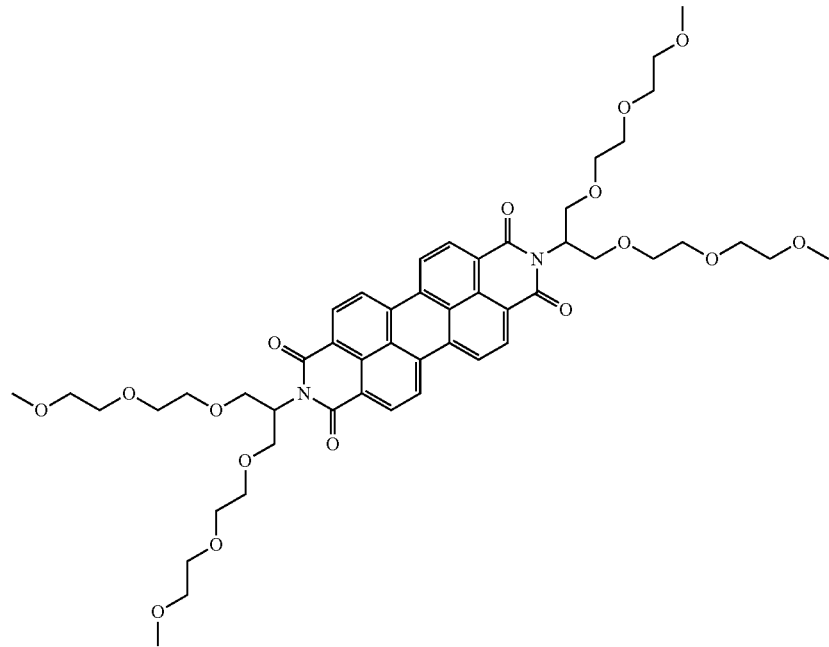
29
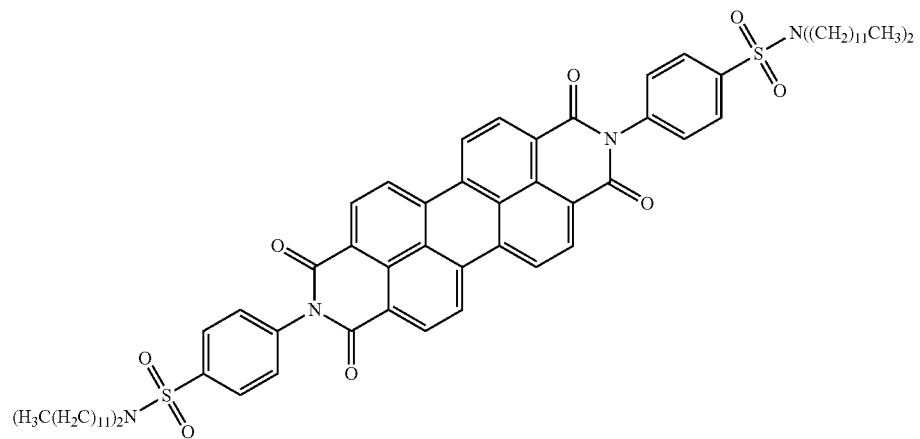
30
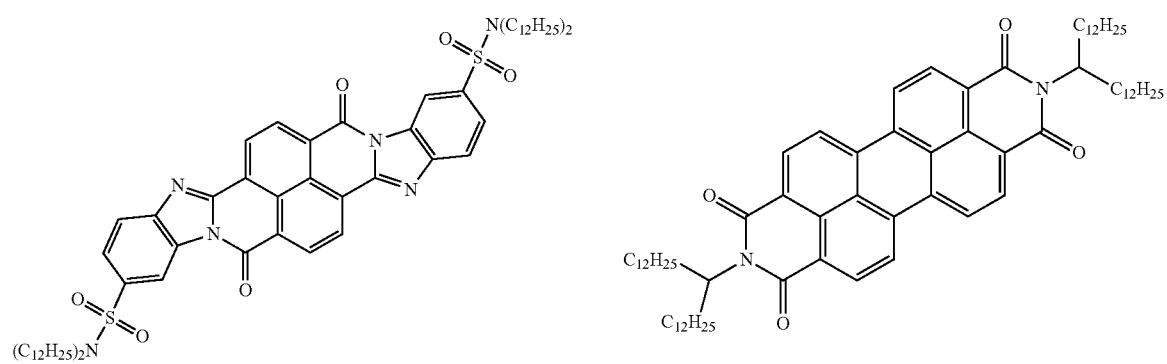
31
32
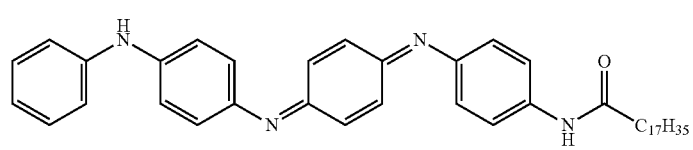
33

34
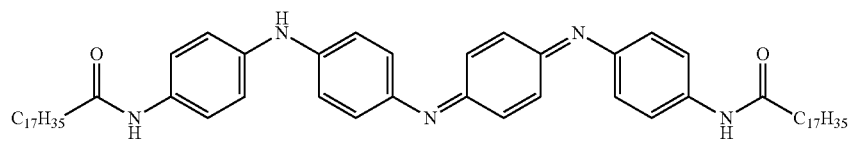
35
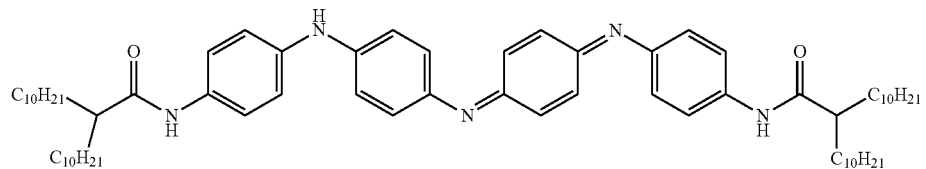
36
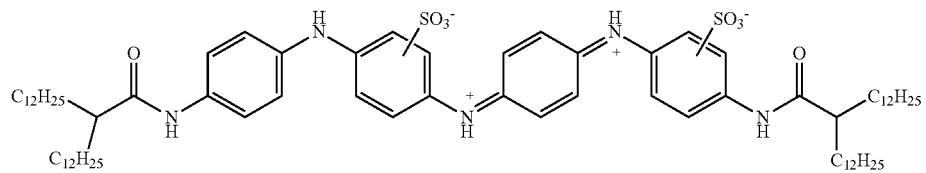
37
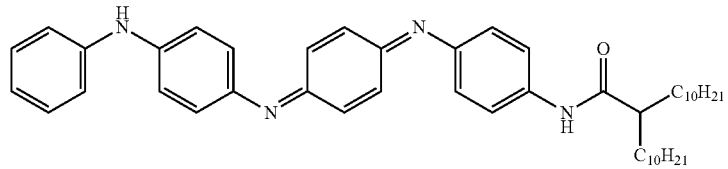
38
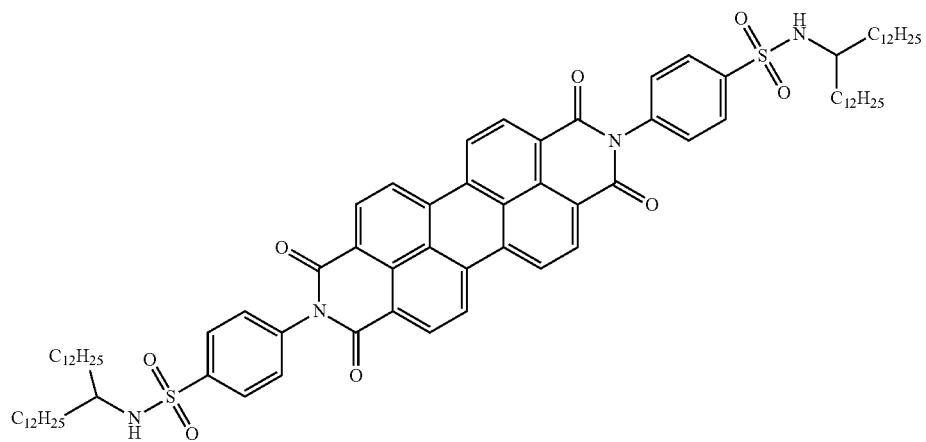
39
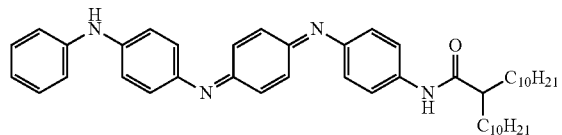
40
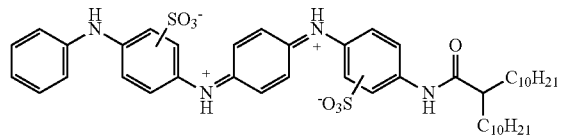
41
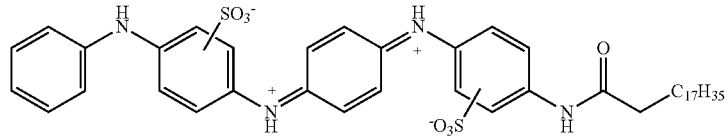

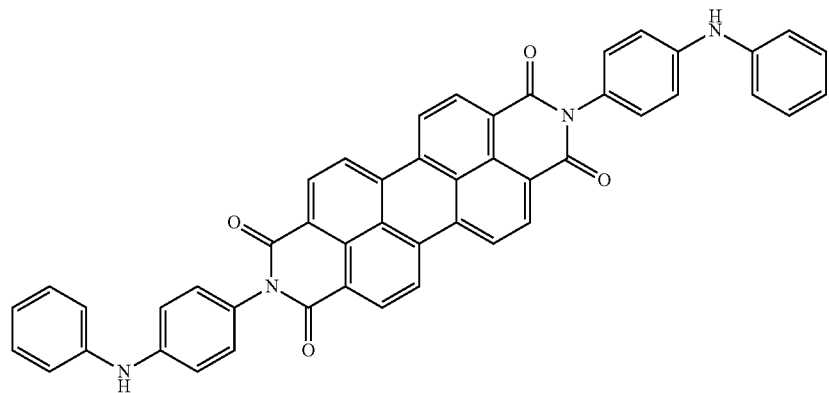
42
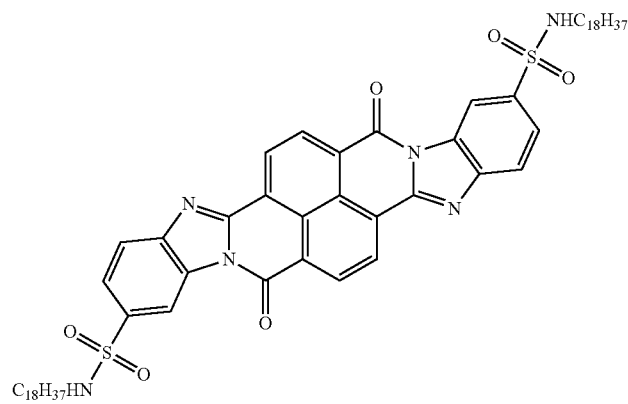
43
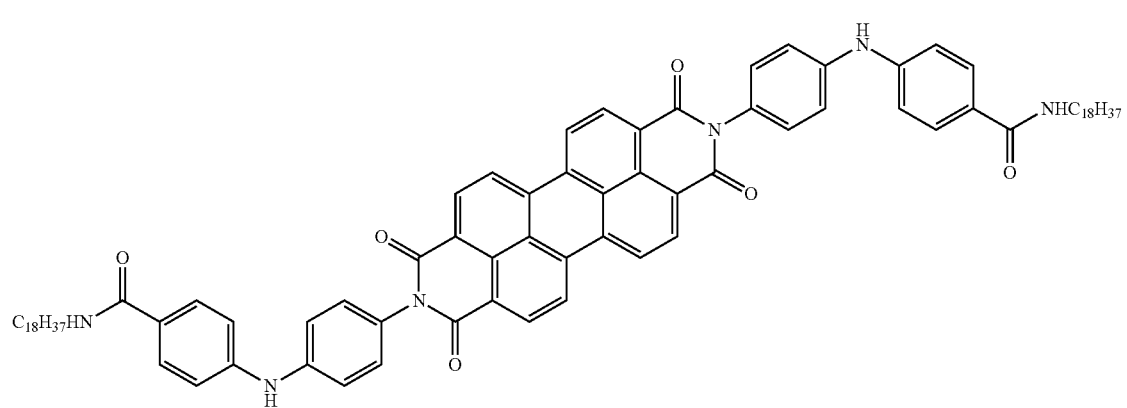
44

45
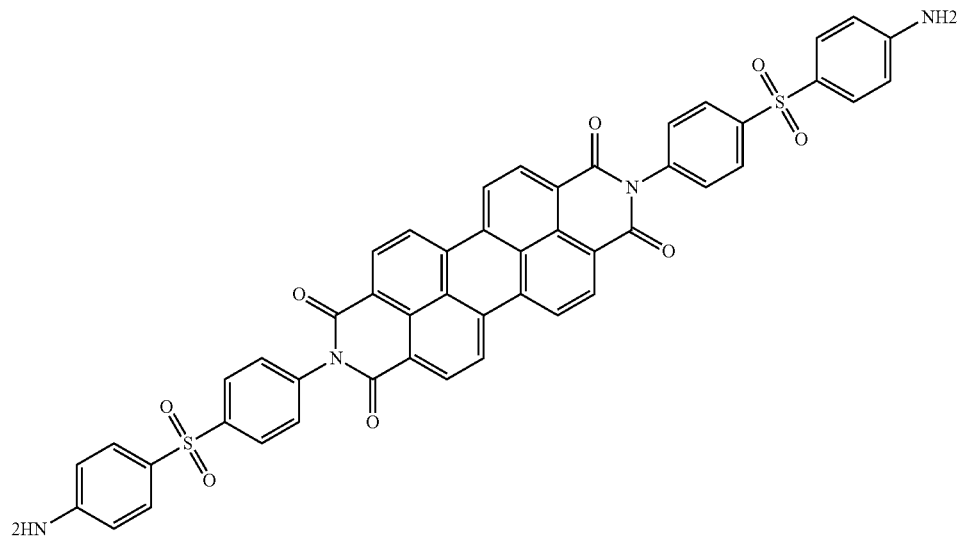
46
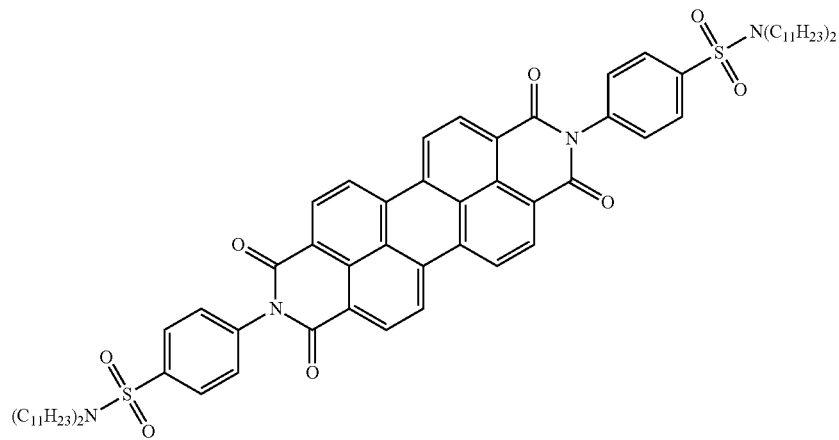
47
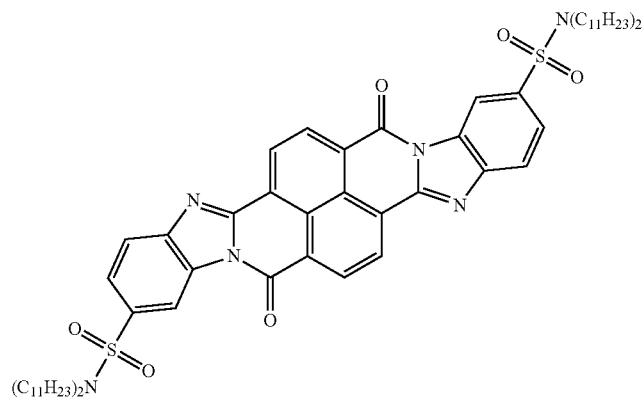
48
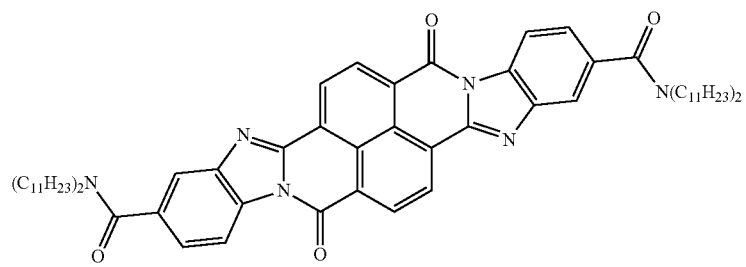

-continued
49
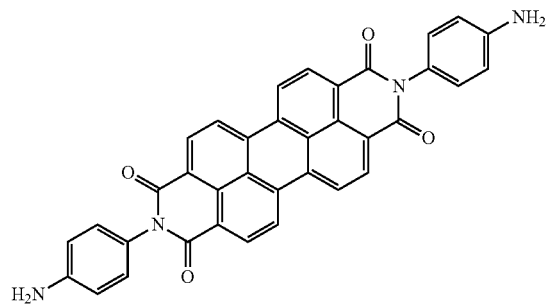
50
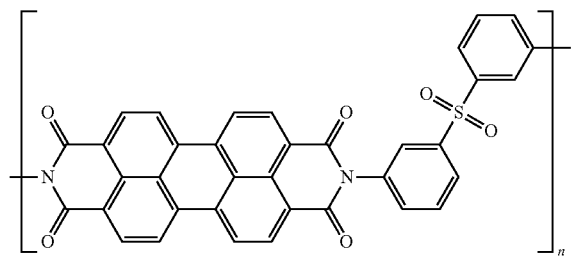
51
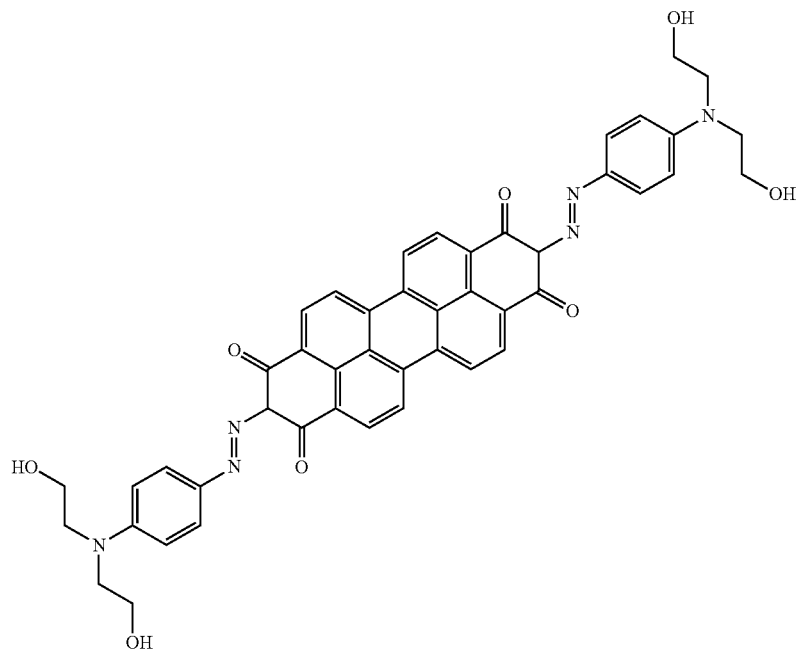
52
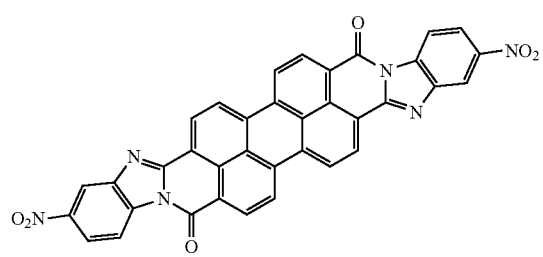
53
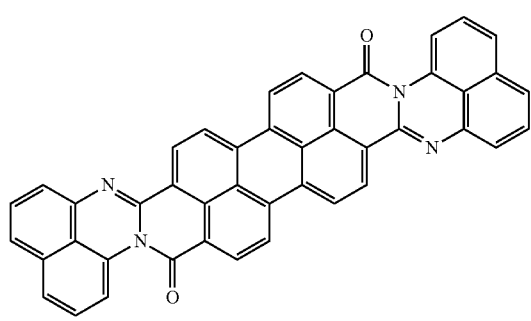

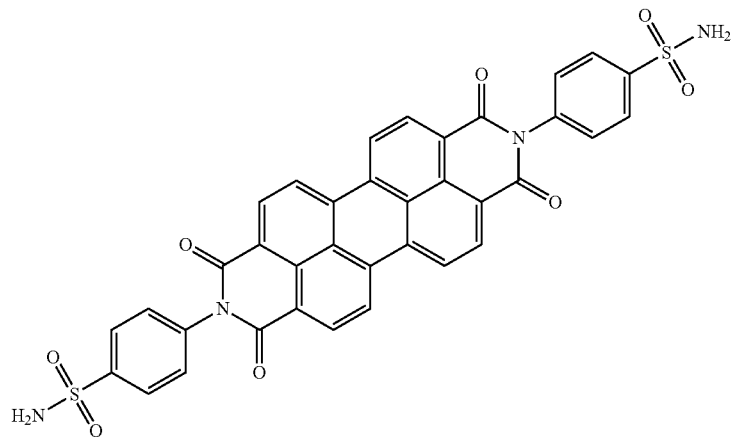
54
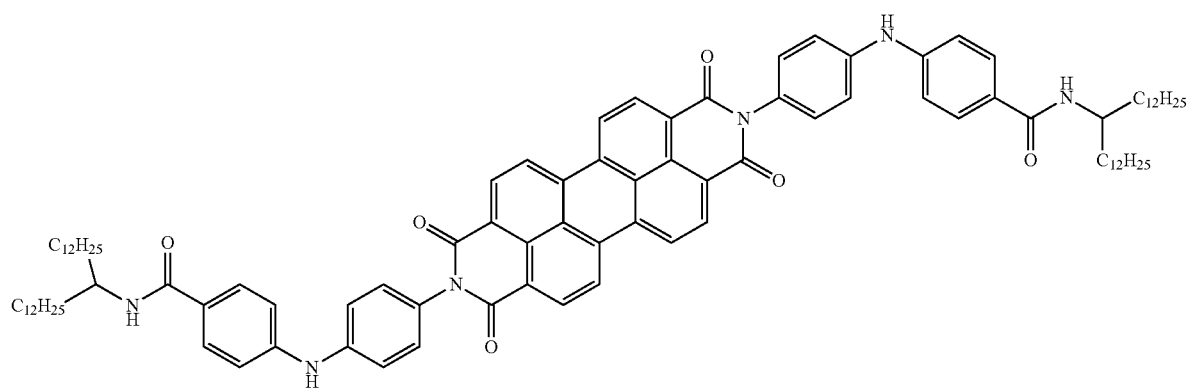
55
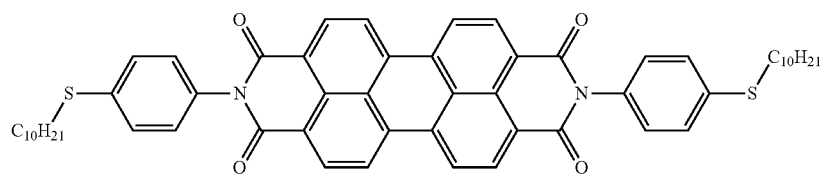
56
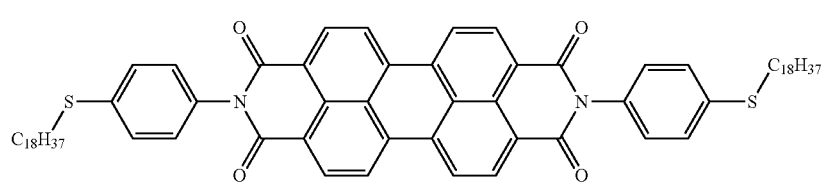
57

58
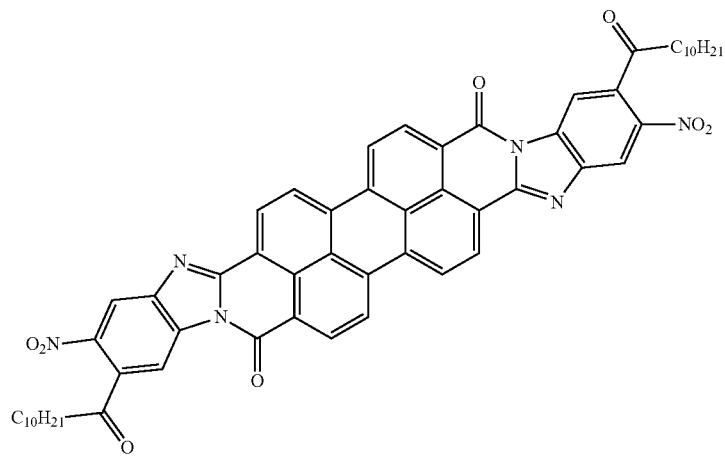
59
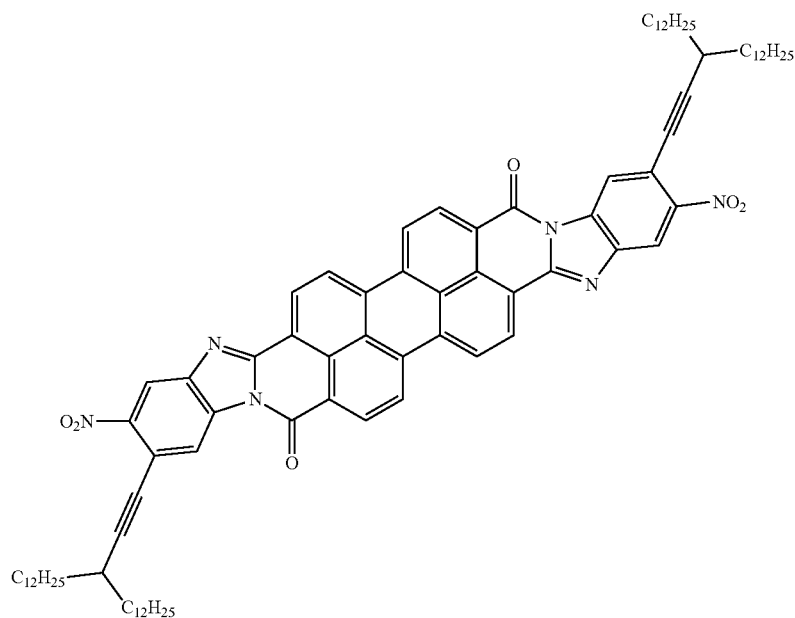
60
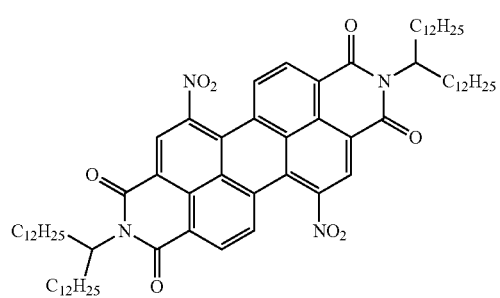
61
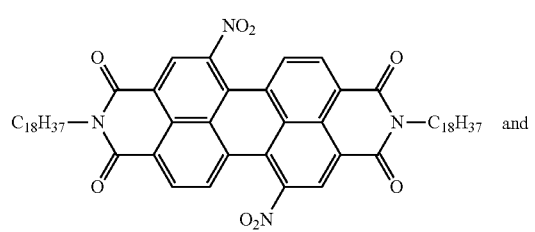
and

-continued
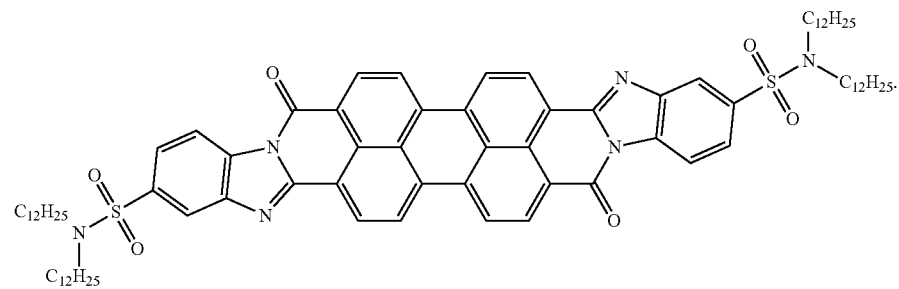
62
* * * * *